(12) United States Patent
Wieland et al.

(10) Patent No.: US 9,643,118 B2
(45) Date of Patent: May 9, 2017

(54) DEVICE FOR REMOVING WET PAINT OVERSPRAY

(75) Inventors: Dietmar Wieland, Waiblingen (DE);
Wolfgang Tobisch, Stuttgart (DE);
Klaus Rundel, Esslingen (DE);
Alexander Rajtschan, Stuttgart (DE)

(73) Assignee: Durr Systems, Inc., Plymouth, MI (US)

( * ) Notice: Subject to any disclaimer, the term of this patent is extended or adjusted under 35 U.S.C. 154(b) by 829 days.

(21) Appl. No.: 11/886,764

(22) PCT Filed: Mar. 17, 2006

(86) PCT No.: PCT/EP2006/002469
§ 371 (c)(1),
(2), (4) Date: Jan. 23, 2009

(87) PCT Pub. No.: WO2006/099999
PCT Pub. Date: Sep. 28, 2006

(65) Prior Publication Data
US 2009/0209188 A1   Aug. 20, 2009

(30) Foreign Application Priority Data

Mar. 24, 2005 (DE) .................. 10 2005 013 711

(51) Int. Cl.
*B01D 46/10* (2006.01)
*B01D 46/00* (2006.01)
(Continued)

(52) U.S. Cl.
CPC ......... *B01D 46/10* (2013.01); *B01D 46/0068* (2013.01); *B01D 46/24* (2013.01);
(Continued)

(58) Field of Classification Search
CPC .................................................. B01D 46/10
(Continued)

(56) References Cited

U.S. PATENT DOCUMENTS 3,041,808 A   7/1962  Snyder
4,354,451 A * 10/1982 Vohringer et al. ............ 118/326
(Continued)

FOREIGN PATENT DOCUMENTS

CA   2237991   5/1997
DE   7014433   4/1970
(Continued)

OTHER PUBLICATIONS

European Search Report dated Feb. 24, 2011.
(Continued)

*Primary Examiner* — Steven B McAllister
*Assistant Examiner* — Samantha Miller
(74) *Attorney, Agent, or Firm* — Warner Norcross & Judd LLP

(57) ABSTRACT

The invention relates to a device for removing wet paint overspray from an outgoing air flow (120) containing overspray particles. The device separates wet paint over-spray from an over-spray particle contained in an exhaust air stream (120). The overspray particles in the exhaust air stream (120) are formed during the painting at an application area (108) of a painting installation (100). The device (126) comprises of at least one separation apparatus for separating the over-spray from the exhaust air stream (120). The separation apparatus includes a regeneratable surface filter (146) and the flow path of the exhaust air stream (120) from the application area (108) to a separating device (145) having at least one narrowed area (146). The central direction of flow of the exhaust air stream (120) remains essentially preserved in passing by the narrowed area (140).

27 Claims, 20 Drawing Sheets

(51) Int. Cl.
  *B01D 46/24* (2006.01)
  *B01D 46/52* (2006.01)
  *B05B 15/12* (2006.01)

(52) U.S. Cl.
  CPC ........ *B01D 46/521* (2013.01); *B05B 15/1248* (2013.01); *B05B 15/1251* (2013.01); *B05B 15/1255* (2013.01); *B05B 15/1262* (2013.01); *B05B 15/1274* (2013.01); *B05B 15/1281* (2013.01); *B01D 2273/12* (2013.01); *Y02P 70/36* (2015.11)

(58) Field of Classification Search
  USPC .......................................................... 454/54
  See application file for complete search history.

(56) References Cited

U.S. PATENT DOCUMENTS

| | | | |
|---|---|---|---|
| 4,409,009 A | 10/1983 | Lissy | |
| 5,022,897 A | 6/1991 | Balcar et al. | |
| 5,039,313 A * | 8/1991 | Gocht | 95/65 |
| 5,147,422 A * | 9/1992 | Neeley et al. | 95/210 |
| 5,169,417 A | 12/1992 | Straub | |
| 5,264,014 A * | 11/1993 | Lannefors et al. | 96/44 |
| 5,326,599 A | 7/1994 | Shutic | |
| 5,690,995 A * | 11/1997 | Fischli et al. | 427/180 |
| 5,746,650 A | 5/1998 | Johnson et al. | |
| 6,024,796 A * | 2/2000 | Salazar et al. | 118/326 |
| 6,226,568 B1 | 5/2001 | Tong et al. | |
| 6,231,646 B1 * | 5/2001 | Schweizer et al. | 96/17 |
| 2002/0033134 A1* | 3/2002 | Fannon | 118/667 |
| 2002/0187083 A1 | 12/2002 | Bundy | |
| 2005/0170768 A1* | 8/2005 | Kelly | 454/53 |
| 2007/0166463 A1* | 7/2007 | Kelly | 427/345 |

FOREIGN PATENT DOCUMENTS

| | | |
|---|---|---|
| DE | 2153777 | 5/1973 |
| DE | 2153777 A1 | 5/1973 |
| DE | 8115387 U1 | 10/1981 |
| DE | 4140490 | 6/1993 |
| DE | 4140490 A1 | 6/1993 |
| DE | 4211465 A1 | 10/1993 |
| DE | 4211465 A1 | 10/1993 |
| DE | 9400668 U1 | 3/1994 |
| DE | 4303753 A1 | 8/1994 |
| DE | 29508187 U1 | 7/1995 |
| DE | 4446089 A1 | 6/1996 |
| DE | 69404175 T2 | 10/1997 |
| DE | 103 61 266 A1 | 7/2005 |
| DE | 10361266 A1 | 7/2005 |
| EP | 0053943 A1 | 6/1982 |
| EP | 59206075 A | 11/1984 |
| EP | 0415511 A1 | 3/1991 |
| EP | 1512465 A1 | 3/2005 |
| JP | 49-16187 | 4/1974 |
| JP | 50-136178 A | 11/1975 |
| JP | 50136178 | 11/1975 |
| JP | 51-055333 A | 5/1976 |
| JP | 52-018265 A | 2/1977 |
| JP | 5242536 | 4/1977 |
| JP | 5220524 | 5/1977 |
| JP | 52056457 | 5/1977 |
| JP | 53109274 A | 9/1978 |
| JP | 5573367 | 6/1980 |
| JP | 55115372 | 8/1980 |
| JP | 56048263 A | 5/1981 |
| JP | 58119370 | 7/1983 |
| JP | 61103564 A | 5/1986 |
| JP | 61143674 | 9/1986 |
| JP | S62-068566 A | 3/1987 |
| JP | 02-95517 | 7/1990 |
| JP | 02-95517 A | 7/1990 |
| JP | 05-505972 | 10/1991 |
| JP | H04-061658 U1 | 5/1992 |
| JP | 4-106668 | 9/1992 |
| JP | 4-106668 A | 9/1992 |
| JP | 5064718 | 3/1993 |
| JP | 05076725 A | 3/1993 |
| JP | 05269414 A | 10/1993 |
| JP | 06-79130 A1 | 3/1994 |
| JP | 06-115412 | 4/1994 |
| JP | 06-115412 A | 4/1994 |
| JP | 6154677 | 6/1994 |
| JP | 06-233956 | 8/1994 |
| JP | 07037311 | 7/1995 |
| JP | 08-103617 A | 4/1996 |
| JP | 09-103723 | 4/1997 |
| JP | 09-117700 | 5/1997 |
| JP | 09-299732 | 11/1997 |
| JP | 10502013 | 2/1998 |
| JP | 10099751 | 4/1998 |
| JP | 10165864 | 6/1998 |
| JP | H10-180175 A | 7/1998 |
| JP | 10296026 A | 11/1998 |
| JP | 11076889 | 3/1999 |
| JP | 2000-167453 | 6/2000 |
| JP | 2002-166206 | 6/2002 |
| JP | 2002248386 | 9/2002 |
| JP | 2008-502294 | 1/2008 |
| JP | 2013-138865 | 7/2013 |
| RU | 2 128 088 C1 | 3/1999 |
| WO | 8902788 A1 | 4/1989 |
| WO | 96/00131 A1 | 1/1996 |
| WO | 9714508 | 4/1997 |
| WO | 9718884 | 5/1997 |
| WO | 02-087780 A1 | 11/2002 |
| WO | WO 02/087780 | 11/2002 |

OTHER PUBLICATIONS

German Search report dated Nov. 15, 2005 for German App. No. 10 2005 013 711.3.
International Search Report dated Jun. 21, 2006.
JP Patent Application Information Statement filed in the Japanese Patent Office on Jun. 30, 2010.
Canadian Intellectual Property Office action mailed on Aug. 26, 2010.
Arguments from the first Office Action dated Oct. 17, 2008 from the corresponding Chinese Patent Application No. 2006000955.6 (8 pages).
Arguments from the first Office Action dated Nov. 29, 2011 from the corresponding Japanese Patent Application No. 2008-502294 (6 pages).
WO/9718884 International Search Report dated Mar. 7, 1997, 6 pages.
WO/9714508 International Search Report dated Jan. 30, 1997, 6 pages.
Notifications of Objection, Ref. A6502f, dated Feb. 20, 2014, 32 pages.
Russian Application No. 2011124144/05 (035621), Russian Search Report, dated Jan. 19, 2012, 3 pages.
English language abstract and machine translation for JP5296414 extracted from https://www4.j-platpat.inpit.go.jp on Jul. 24, 2015.
English language abstract for JP61103564A extracted from https://www4.j-platpat.inpit.go.jp on Jul. 24, 2015.
English language abstract for DE4211465A1 extracted from http://worldwide.espacenet.com on Jul. 24, 2015.
Unknown third party IDS submitted to Japanese Patent Office on Jun. 18, 2015.
English language abstract and machine translation for JP08-103617A extracted from https://www4.j-platpat.inpit.go.jp on Oct. 23, 2015, 7 pages.
English language abstract and machine translation for JP08-103617A, 8 pages.
Japanese Office Action and machine translation, Aug. 27, 2015, 13 pages.
Japanese Office Action and machine translation, Sep. 25, 2015, 13 pages.

(56) References Cited

OTHER PUBLICATIONS

Partial English language machine translation for JPH02-102735 (published as JP H04-061658 U1) extracted from https://www4.j-platpat.inpit.go.jp on May 19, 2016, 1 page.
Japanese Office Action and English translation, Apr. 6, 2016, 6 pages.
English language abstract and machine translation for DE 4446089.
English language abstract and machine translation for JP H10-180175.
English language abstract and machine translation for JP S62-068566.
Unknown third party IDS submitted to Japanese Patent Office on Oct. 11, 2016.
Japanese Information Statement, 2013-138865, dated Apr. 15, 2014, 17 pages.
Japanese Information Statement, 2008-502294, dated Mar. 31, 2014, 24 pages.
Japanese Information Statement, 2008-502294, dated Mar. 31, 2014, 6 pages.
JP Office Action, Nov. 29, 2011.

\* cited by examiner

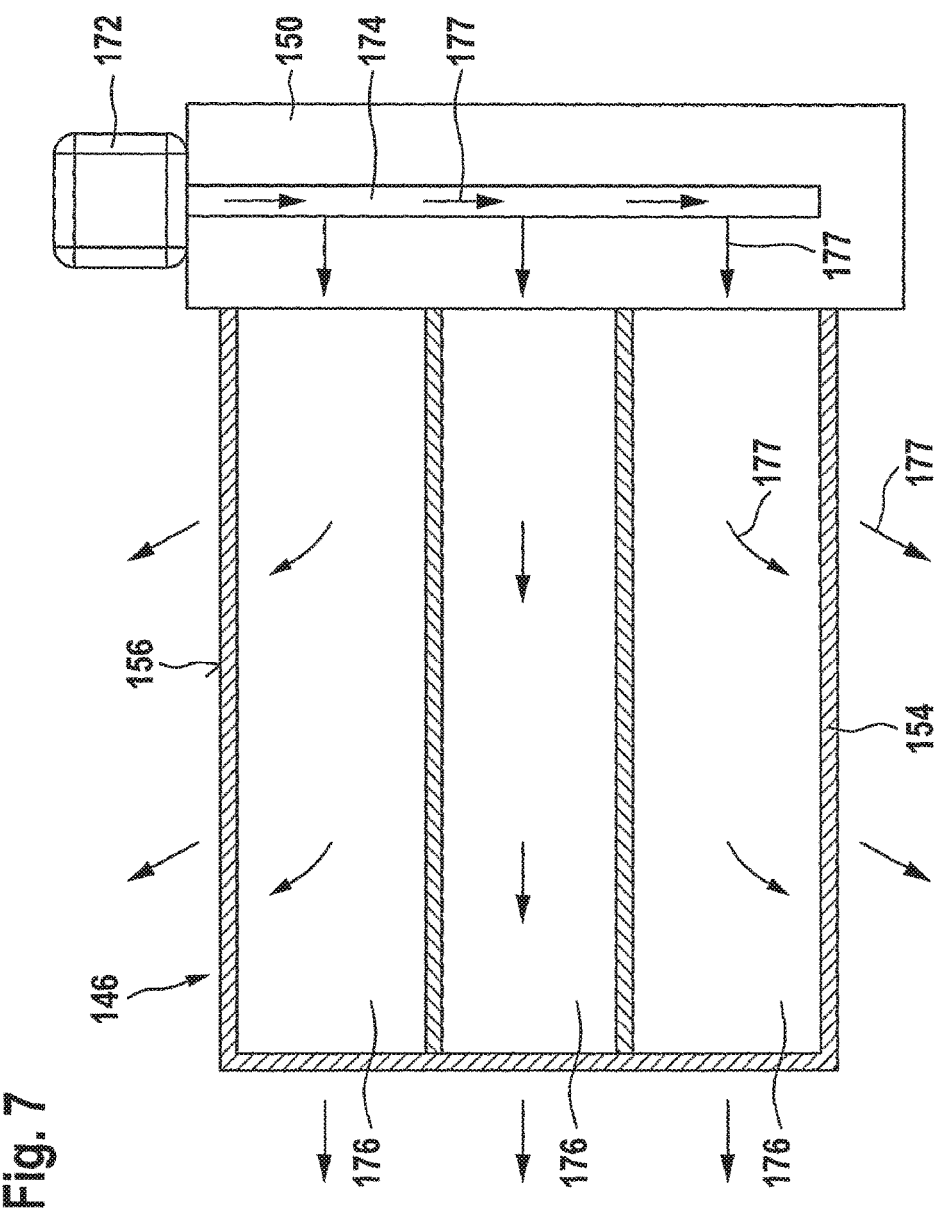

DEVICE FOR REMOVING WET PAINT OVERSPRAY

RELATED APPLICATIONS

This application claims priority to and all the advantages of International Patent Application No. PCT/EP2006/002469, filed on Mar. 17, 2006, which claims priority to DE10 2005 013 711.3 filed on Mar. 24, 2005 and is incorporated herewith by reference in its entirety.

The present invention relates to a device for removing wet paint overspray from an exhaust air flow containing over-spray particles, whereby the over-spray particles in the exhaust air flow reach into an application area of a painting installation.

BACKGROUND OF THE INVENTION

Such devices are used in plants for painting work parts, in particular for spray-painting vehicle bodies, in which an air flow is produced by an application area of the plant, which exhausts excess wet paint from the application area.

It is well-known to separate out the carried wet paint over-spray of a washing plant from the exhaust air flow by means of a washing liquid.

Known washing plants have the disadvantage, however, in particular with air circulation control, in that a high amount of moisture is supplied to the exhaust air flow from from which the wet paint over-spray is separated, so that the exhaust air flow resulting after separation of the wet paint over-spray must be subjected to a energy-intensive dehumidification.

Furthermore, greater expense is required for the treatment of the washing liquid loaded with the wet paint over-spray.

BRIEF SUMMARY OF THE INVENTION

The basic object of the present invention is to provide a device of the aforementioned type which enables a separation of the wet paint over-spray from the exhaust air flow in a simple, reliable and energy-saving way.

This problem is solved according to the invention with a device having the characteristics of the generic terms of claim 1, in that the device comprises at least one separation apparatus for separating the over-spray from at least one part of the exhaust air flow, which has at least one regeneratable surface filter, and that the flow path of the exhaust air flow from the application area to the separating apparatus comprises at least one narrowed area, whereby the central direction of flow of the exhaust air flow remains essentially preserved in passing the narrowed area.

A regeneratable filter is understood to be one which has a filter surface upon which the wet paint over-spray carried by the exhaust air flow is separated-off, and that, preferably during the operating process of the device, is cleanable from the separated-off paint over-spray thereon.

Such a regeneratable surface filter is a "dry" separation device in which no liquid is used for washing the over-spray particles out of the exhaust flow, but instead filter elements are used for separation of the over-spray particles from the air flow.

Thereby, cleaning of the regeneratable surface filter by means of a "dry" separation device can take place, that is, without using a cleaning fluid or a "wet" cleaning device which, utilizes a liquid.

A "dry" separation device can also be provided with "wet" cleaning apparatus, as long as the deposition of the over-spray particles on the regeneratable separation element takes place in a dry manner, that is.

A "dry" separation device can also be provided with a "wet" cleaning device, as long as the deposition of the over-spray particles on the regeneratable separation element takes place in a dry manner, that is, without washing using a washing fluid.

Preferably the entire separation of wet paint over-spray from the exhaust air flow containing the over-spray particles takes place completely dry, that is, without use of a fluid for washing the over-spray particles out of the exhaust air flow.

Use of a regeneratable surface filter in the separation device circumvents the necessity of providing a washing station and the associated water treatment. Thereby, the energy-consumption of the separation device and (owing to the omission of the water treatment) also the space-requirements of the device are significantly reduced.

The capacity to be cleaned of the surface filter also further ensures a long service life of the filter with large quantities of resulting wet paint over-spray.

In view of the provision of a narrowed range in the exhaust air flow path from the application area to the separation device, it is furthermore achieved that the regeneratable surface filter is protected against direct effects from the application area.

Thereby, that the central flow direction of the exhaust air flow in passing the narrowed area remains essentially preserved, it is achieved that a premature deposition of wet paint over-spray on the boundary walls of the narrowed area is avoided.

In a preferred arrangement of the device according to the invention, the narrowed area is located beneath the application area.

If the application area is arranged in a painting booth, then the narrowed area is preferably disposed within a vertical projection of the basal area of the painting booth.

To prevent the wet paint over-spray from the exhaust air flow from already settling on the boundary walls of the narrowed area, it is an advantage if the elongation of the narrowed area in the flow direction of the exhaust air flow is shorter than approx. 6 m, preferably shorter than approx. 1 m, in particular shorter than approx. 0.5 m.

If the application area is arranged in a painting booth with a longitudinal direction, then the narrowed area preferably extends in the longitudinal direction of the painting booth over essentially the entire length of the painting booth.

Thereby the narrowed area in the longitudinal direction of the painting booth can be divided into several narrowed sub-areas.

Alternatively, it can also be provided that the narrowed area in the longitudinal direction of the painting booth is not divided.

If the application area is disposed in a painting booth with a transverse direction, it can be provided that the narrowed area in the transverse direction of the painting booth is divided into several narrowed sub-areas.

Alternatively, it can also be provided that the narrowed area in the transverse direction of the painting booth is not divided.

The entrance of the exhaust air flow into the narrowed area is preferably arranged above the at least one regeneratable surface filter.

If the application area is disposed in a painting booth with a transverse direction, then the smallest cross-section of the narrowed area flowed through by the exhaust air stream preferably has an extension in the transverse direction of the painting booth, which amounts to at most approx. 20% of the extension of the painting booth in the transverse direction of the painting booth.

In order for the at least one regeneratable surface filter to be protected against damages, it is advantageous if at least one shielding element is arranged vertically over the at least one regeneratable surface filter, which will prevent a vertical falling down of articles, dirt and/or paint particles from the application area upon the regeneratable surface filter.

Thereby it may be provided that the at least one shielding element forms the boundary of the narrowed area.

In order for favorable flow conditions in the exhaust air flow path to be obtained, it is desirable if the device contain at least one flow-guidance element, which directs at least one portion of the exhaust stream to the narrowed area.

Thereby the flow guidance element can feature an at least in sections, essentially horizontally aligned flow guidance surface.

Alternatively, it may also be provided that the flow guidance element features a flow guidance element inclined at least in sections against the horizontal, preferably towards the narrowed area.

If the device has a bottom, which limits the exhaust air flow path downward, it can be provided that at least one part of the bottom is covered by an area separated from the area of the device flowed through by the exhaust air. In this way the bottom surface area is reduced, which is contaminated by wet paint over-spray separating out of the exhaust air flow before reaching the at least one surface filter. Thereby, it can be provided that an upper boundary wall of the area separated from the area of the device flowed through by the exhaust air flow forms at least one part of a flow guidance element, which directs at least one portion of the exhaust air flow to the narrowed area.

If the application area is arranged in a painting booth and the device comprises at least one exhaust air duct, into which at least one portion of the exhaust air flow enters after passing the separation device, then a special space-saving structure of the device is achieved, if the exhaust air channel is disposed within a vertical projection of the basal surface of the painting booth.

In order to facilitate the cleaning of the regeneratable surface filter, it is advantageous, if the at least one exhaust air channel exhibits a barrier layer comprising a pre-coat material. which prevents agglutination of the filter surface.

For the barrier layer made of precoat-material to fabricate on the surface filter, it can be provided that the device comprises at least one pre-coat feeding apparatus, which delivers a pre-coat material in the exhaust air flow.

Thereby, the supply of pre-coat material in the exhaust air flow can take place continuously or in intervals.

As pre-coat materials, lime, aluminum silicates, aluminas, silicon oxides, powder coatings or the like are taken into consideration.

In principle, any medium is suitable as a pre-coat material which has the capacity to absorb the liquid portion of the wet paint over-spray.

Moreover it is possible, to arrange the at least one pre-coat feeding apparatus in direct connection to the application area, for example on the bottom area of the painting booth.

But it is particularly advantageous if the at least one pre-coat feeding apparatus is disposed at the narrowed area of the exhaust air flow path. In the narrowed area of the exhaust air flow path high flow velocities control, so that by the feeding of the pre-coat material to this location a particularly good pre-coat distribution is obtained by means of venturi turbulence.

With pre-coating there is the possibility of interim pre-coating, whereby a new pre-coating material is applied without prior cleaning of the surface filter, so that the later cleaning characteristics of the surface filter are improved.

The at least one regeneratable surface filter of the separation device is preferably capable of being cleaned in intervals.

Alternatively or additionally it can thereby be provided that the at least one regeneratable surface filter exhibits a moist surface in the operation of the device.

The surface filter can be kept damp, for example, by use of rinsing- or humidification media such as demineralized water, butylglycol or other solvents, in order to facilitate the cleaning of the surface filter.

These humidification media can be introduced at the same locations in the exhaust air stream as the previously described pre-coat materials.

For a basic cleaning of the filter surface of the surface filter it is advantageous, if the surface of the at least one regeneratable surface filter is capable of being rinsed off continuously or in intervals.

Alternatively or additionally it can thereby be provided that the at least one regeneratable surface filter is capable of being cleaned by compressed air impulses.

A particularly energy-saving operation of the painting installation is possible, if the device has an air circulation cycle, in which the exhaust air flow, from which the wet paint over-spray has been separated, is at least partially re-delivered to the application area.

Claim 30 directed to an installation for the painting of objects, particularly of vehicle bodies, which comprises at least one painting booth and at least one device according to the invention for separating wet paint over-spray from an over-spray particle-containing exhaust air stream.

BRIEF DESCRIPTION OF THE FIGURES

Further characteristics and advantages are the subject of the following description and graphic illustration of exemplary embodiments.

In the drawings appear:

FIG. 7 a schematic longitudinal section through the surface filter of FIG. 6, which illustrates a cleaning process of the surface filter;

Equal or functionally equivalent elements are designated in the figures with the same reference symbols.

DETAILED DESCRIPTION OF THE INVENTION

Figure 1:
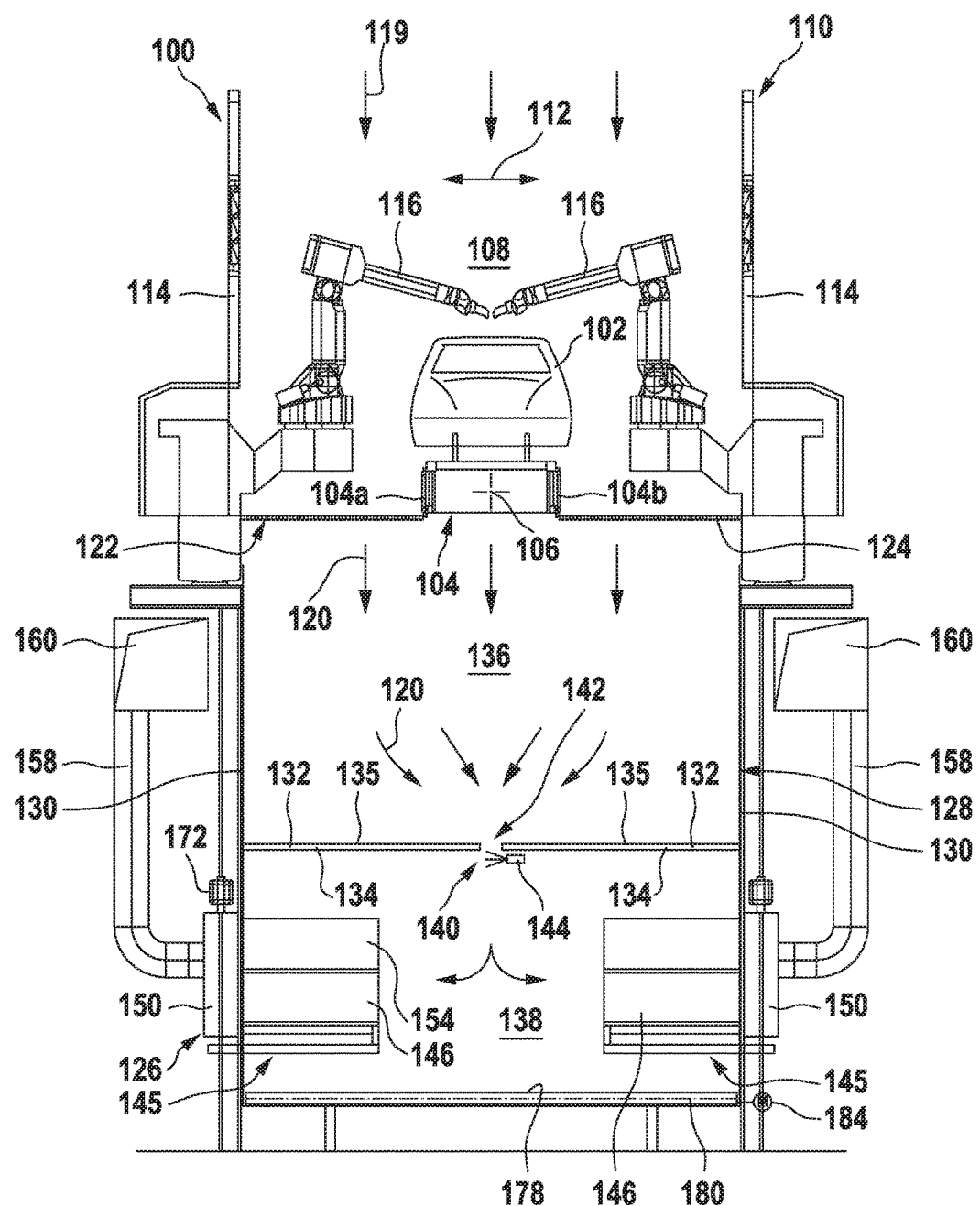
FIG. 1 a schematic vertical cross-section through a first embodiment of a painting booth with a device arranged under it for separating wet paint over-spray from an over-spray particle-containing exhaust air stream, which includes two separation devices for separating the over-spray from the exhaust air stream and also two exhaust ducts, which run laterally to the left and/or right alongside the floor plan of the painting booth, whereby a narrowed area of the flow path of the exhaust air stream is provided between an application area of the painting booth and the separation devices, which is bounded by horizontally aligned flow guidance elements.

An installation shown in FIGS. 1 to 7, marked 100 as a whole for the spray-coating of vehicle bodies 102 which includes a clearly schematically represented conveyer device 104, by means of which the vehicle bodies 102 can be moved along in a conveying direction 106 through an application area 108 of a painting booth marked 110 as a whole.

The conveying device 104 can, by way of example, be constructed as an inverted circular conveyer or as an inverted monorail conveyer.

Figure 3:
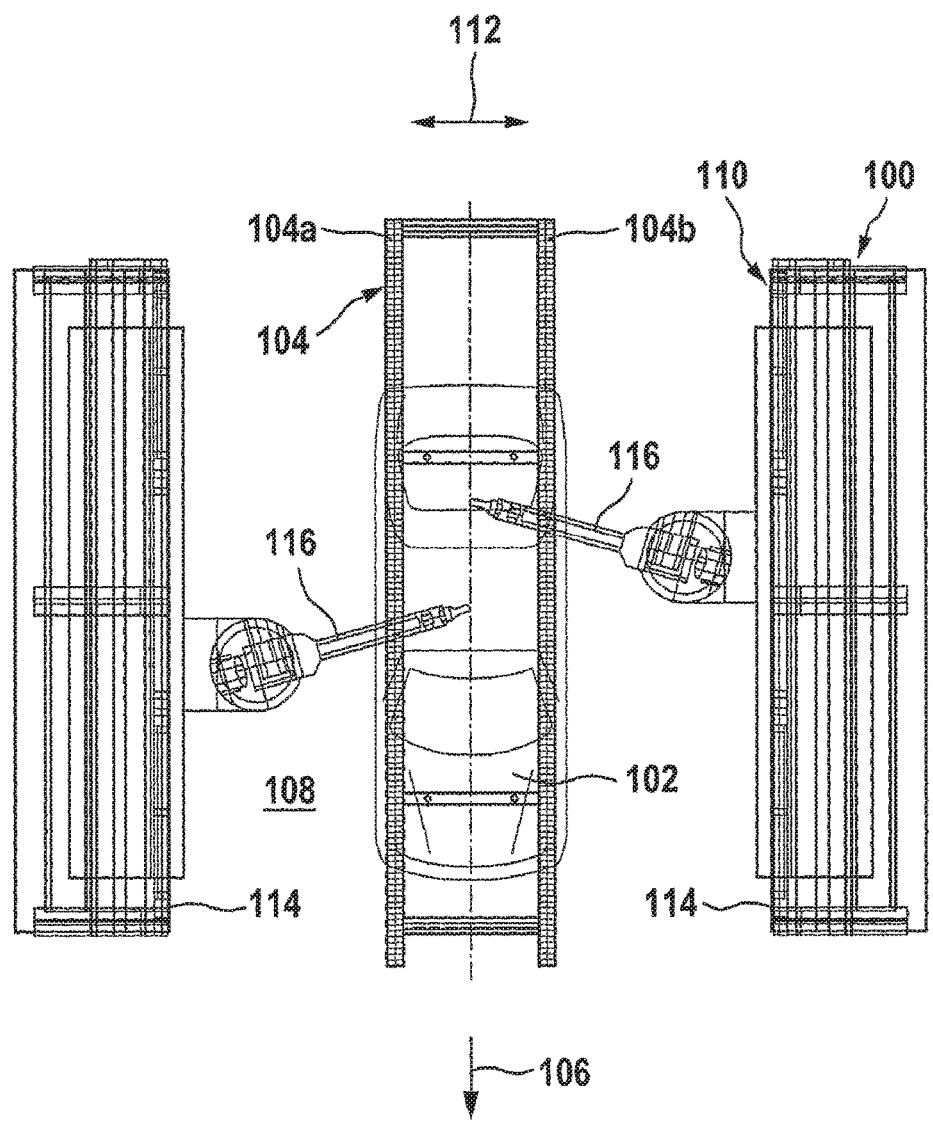
FIG. 3 a schematic top view from above of the installation of FIGS. 1 and 2.
Figure 4:
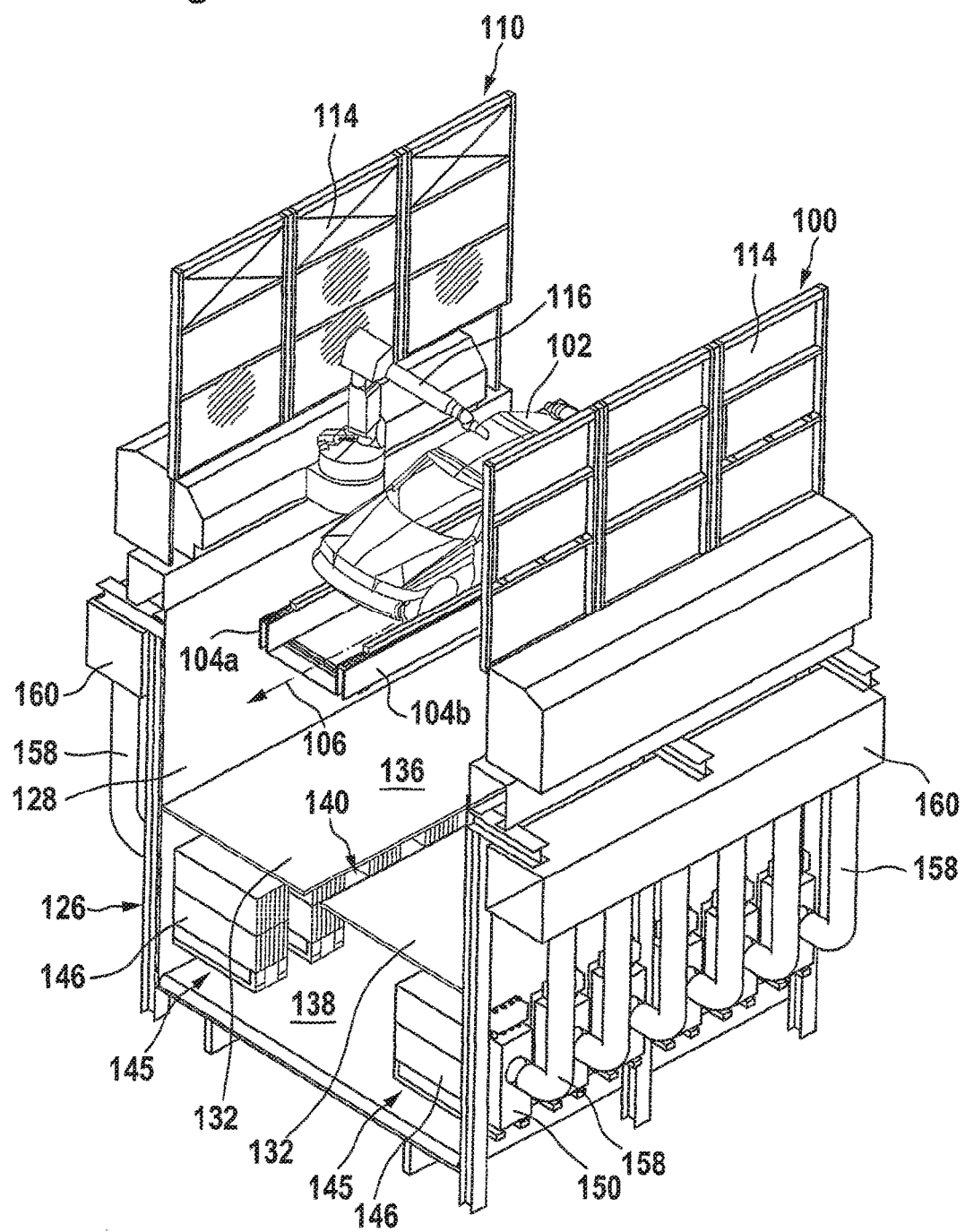
FIG. 4 a schematic representation in perspective of the installation of FIG. 1 to FIG. 3.

In particular the conveyer device 104 can be formed in two parts and—as best understood from FIGS. 1, 3 and 4—includes two conveyer belts 104a and 104b extending parallel to the conveyer 106, which are spaced apart from one another in a horizontal direction perpendicular to the conveyer 106.

The application area 108 is the interior chamber of painting booth 110, which perpendicular of it to the conveyer 106, which corresponds to the longitudinal direction of the painting booth 110, it is limited, respectively, by a booth wall 114 running in horizontal transverse direction 112 on both sides of the conveyer device 104.

On both sides of the conveyer device 104 spray-painting devices 116 (see FIGS. 1-4) are arranged in the painting booth 110, for example, in the form of paint application robots.

Figure 5:
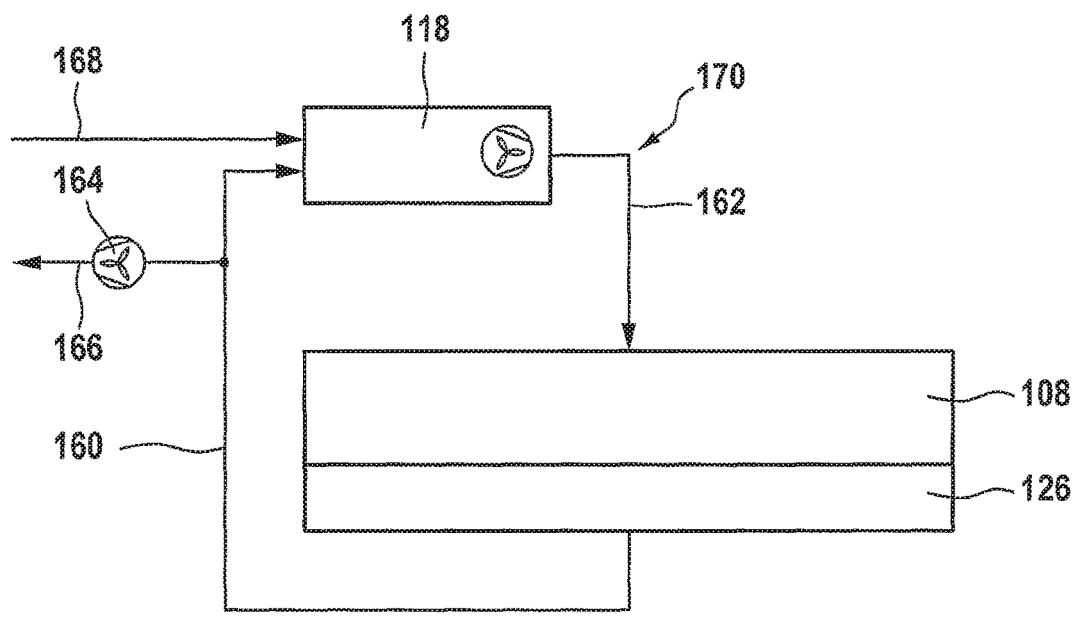
FIG. 5 a schematic representation of an air circulation cycle of the installation of FIGS. 1 to 4.

By means of a compressed air production device 118 schematically represented in FIG. 5 an air stream is produced which essentially pervades the application area vertically from top to bottom, as indicated by the arrow 119 in FIG. 1.

This air stream takes up paint over-spray in the form of over-spray particles in the application area 108.

The term "particle" includes solid as well as liquid components, particularly drops.

A wet paint is used for coating in the installation 100, thus the wet paint over-spray consists of paint drops.

Most of the over-spray particles have a largest size of in a range from approx. 1 μm to approx. 100 μm.

The exhaust air flow designated by the arrow 120 leaves the painting booth 110 through a booth bottom 122, which contains an air-permeable lattice grate 124.

The installation 100 also includes a device marked 126 as a whole, for separating wet paint over-spray from the air flow 120, which is arranged beneath the application area 108.

The device 126 includes an essentially quadrangular-shaped flow chamber 128, which reaches over into the conveyer 106 over the whole length of the painting booth 110 and is bounded in the transverse direction 112 of the painting booth 110 by vertical side-walls 130, which align essentially with the lateral booth-walls 114 of the painting booth 110, so that the flow chamber 128 has essentially the same horizontal cross-sectional area as the painting booth 110 and is arranged essentially completely within the vertical projection of the basal surface of the painting booth 110.

The flow chamber 128 is subdivided by flow guidance elements 132, which in this exemplary embodiment are formed as essentially horizontal flow guidance plates 134, into an upper section 136 and a lower section 138.

The upper section 136 and lower section 138 of the flow chamber 128 are connected to each other by a narrowed area 140, which is in the form of a space 142 between the free borders opposite to each other of the flow guidance elements 132 and which forms a narrowing in the flow path of the exhaust air stream 120 through the flow chamber 128.

The upper sides of the flow guidance elements 132 form in each case a flow guidance surface 135, which directs the exhaust air stream to the narrowed area 140.

A pre-coat feed device 144 is arranged at the narrowed area 140 of the flow path, which continuously or intervalwise supplies a pre-coat material into the exhaust air stream 120.

The pre-coat feed device 144 can, for example, be designed as a pre-coat spray nozzle, which supplies the pre-coat material in the form of a spray mist into the exhaust air stream 120.

The arrangement of the pre-coat feed device 144 at the narrowed area 140 of the exhaust air stream 120 offers the advantage, that there due to the elevated flow velocity of the exhaust air stream 120 and because of the small passage cross-section, turbulences appear in the exhaust air stream, which make possible a swirling of the pre-coat material in the exhaust air stream 120 and consequent particularly good distribution of the pre-coat material in the exhaust air stream 120.

The pre-coat supply device 144 is attached to a (not shown) pre-coat feed pipe which feeds the pre-coat material in flowable condition via a (not shown) pre-coat feed pump from a (not shown) pre-coat storage container.

In principle, any medium is suitable as a pre-coat material which has the capacity to absorb the liquid portion of the wet paint over-spray.

For example, as pre-coat materials, lime, aluminum silicates, aluminas, silicon oxides, powder coatings or the like are taken into consideration.

In order to make the pre-coat material flowable and sprayable, i.e. aqueous dispersions of the aforementioned materials are used.

If the filter sequential to the pre-coat feed device 144 is not to be pre-coated, but should only be moisturized, then also only a moisturizing medium can be introduced into the exhaust air stream 120 by means of the pre-coat feed device 144.

As such, moisturizing media in particular i.e., demineralized water, butylglycol or other solvents are taken into consideration.

A separation device 145 for separating wet paint over-spray from the exhaust air stream 120 is provided in the lower section 138 of the flow chamber 128 on both sides, respectively, of the narrowed area 140. The separation devices 145 include several regeneratable surface filters 146, spaced apart from each other on the conveyer 106, arranged, respectively, opposite to one another on both sides of the vertical side-walls 130 of the flow chamber 128, which with their filter elements 148 extend into the lower section 138 of the flow chamber 128 (see in particular FIGS. 1, 2 and 4).

Figure 6:
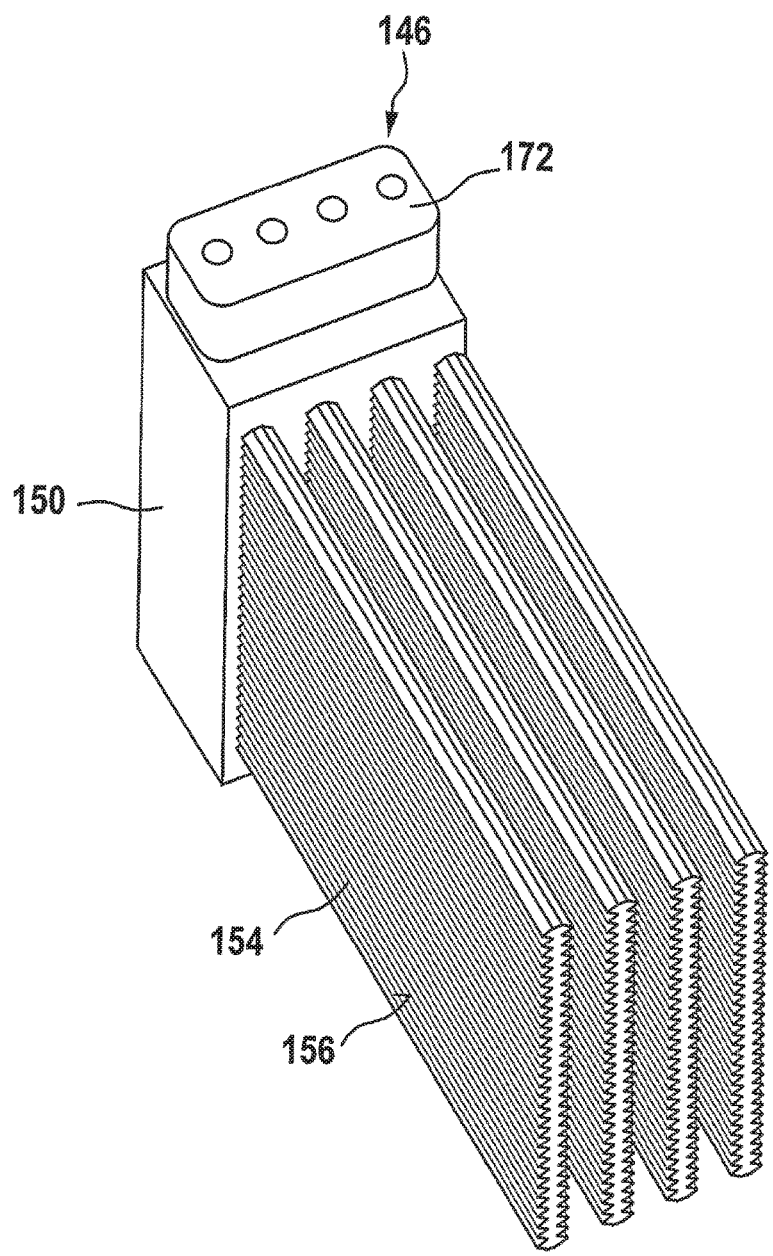
FIG. 6 a schematic representation in perspective of a regeneratable surface filter of the installation of FIG. 1-FIG. 5.

This regeneratable surface filter 146 is shown in detail in FIGS. 6 and 7.

Each of the regeneratable surface filters 146 contains a hollow fundamental body 150, to which several, for example, four filter elements 154 are attached.

Filter elements 154 are, for example, are formed essentially in a plate shape and preferably feature, as is seen from FIG. 6, a serrated cross-section, in order for the available filter surface 156 to be enlarged.

The filter elements 154 can be formed, for example, as plates made from sintered polyethylene, which are provided with a polytetrafluoroethylene (PTFE) membrane on their outer surface.

Alternatively or additionally, it can also be provided that the filter elements 154 are made of a non-woven fabric with a PTFE coating.

For this reason, the PTFE coating serves, as the case may be, to raise the filter quality of the surface filter 146 (that is, to diminish its' permeability) and also to prevent the permanent adhesion of the wet paint over-spray deposited from the exhaust air stream 120.

Both the base material of the filter element 154 and its' PTFE-coating exhibit a porosity, so that the exhaust air can pass through the pores into the interior space 176 of the respective filter element 154.

To prevent the agglutination of the filter surface 156, it is further provided with a barrier layer formed from the pre-coat material supplied in the exhaust air stream 120.

This barrier layer easily forms itself in the operation of device 126 by deposition on the filter surface 156 of the pre-coat material released in the exhaust air stream 120.

Preferably, the amount of pre-coat material released into the exhaust air stream 120 is regulated, so that the thickness of the barrier layer made from the pre-coat material on the filter element 154 of the regeneratable surface filter 146 is in the range of i.e. approx. 150 μm to 200 μm.

The exhaust air stream 120 overcoats the filter surfaces 156 of the filter element 154 of the regeneratable surface filter 146, whereby both the carried pre-coat material and also the carried wet paint over-spray is deposited upon the filter surfaces 156, and passes through the porous filter surfaces 156 into the interior space 176 of the filter element 154, which are connected with the hollow space within the fundamental body 150.

The purified exhaust air stream 120 thus by going through the fundamental body 150 passes, respectively, into an exhaust air pipet 158, which leads from the respective regeneratable surface filter 146 to an exhaust air duct 160 on the side next to a vertical side-wall 130 of the flow chamber 128, which duct runs parallel to conveyer 106.

As is clear from the schematic representation of FIG. 5, the purified exhaust air from the wet paint over-spray passes out of the two exhaust air ducts 160 at least partially back to the air flow production device 118, which conducts the purified exhaust air via a supply line 162 once again to the application area 108 in the painting booth 110.

Another part of the purified exhaust air stream is delivered via an exhaust air blower 164 in an exhaust air supply line 166 to the surrounding area.

This part of the exhaust air stream delivered to the surrounding area is replaced by fresh air, which is fed to the air flow production device 118 via a fresh air supply line 168.

The main part of the air led through the application area 108 is thus guided in an air circulation cycle 170, which includes the air production device 118, the supply line 162, the application area 108, the flow chamber 128 and the exhaust air duct 160, whereby a constant heating of the fresh delivered supply air is avoided and thereby the energy costs are significantly lowered.

Since the separation of the wet paint over-spray from the exhaust air stream 120 by means of the regeneratable surface filter 146 takes place dry, that is, without washing with a cleaning fluid, the air guided in the air circulation cycle 170 is not humidified in the separation of the wet paint over-spray, so that no devices for humidification of the air guided in the air circulation cycle 170 are necessary at all.

Furthermore, no devices are necessary for separating the wet paint over-spray from a washout-cleaning fluid.

The regeneratable surface filter 146 is cleaned by compressed air impulses in determined time intervals, when its' coating by wet paint over-spray reaches a preset amount.

This cleaning can take place, i.e. one time per work shift, that is, two or three times per work day.

The required compressed air impulse is produced by a compressed air reservoir 172, which is arranged at the fundamental body 150 of the respective regeneratable surface filter 146 and thereby is in the position, to deliver compressed air impulses to a compressed air pipe 174, which runs within the respective fundamental body 150 and leads from the compressed air reservoir into the interior space 176 of the filter element 154.

From the interior spaces 176 of the filter element 154 the compressed air impulse passes through the porous filter surfaces 156 into the outer space of the filter element 154, whereby the barrier layer formed from pre-coat material on the filter surfaces 156 and the wet paint over-spray deposited on the filter surfaces 156 are dissolved, so that the filter surfaces 156 are converted back into their cleansed original condition.

The flow direction of the compressed air through a regeneratable surface filter 146 during the cleaning is designated in FIG. 7 by the arrow 177.

The compressed air reserve in the compressed air reservoir 172 is replenished by (not shown) compressed air supply lines from an on-site compressed air network.

A cleaning by compressed air impulses can alternatively or additionally be modified such that the regeneratable surface filter 146 is washed out by means of suitable spray device in specified intervals, in order to remove the wet paint over-spray deposited on the filter surfaces 156.

Figure 2:
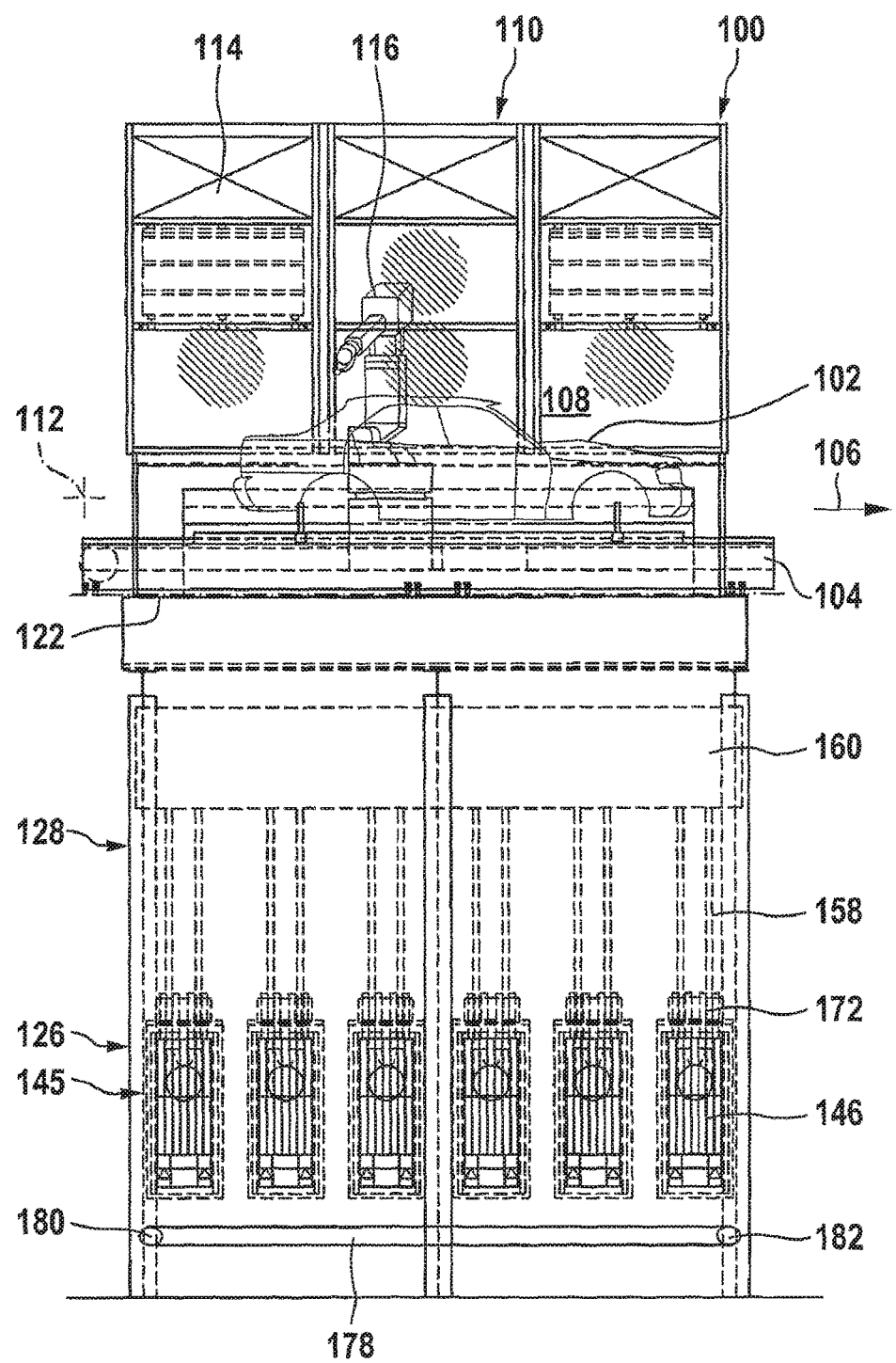
FIG. 2 a schematic side view of the installation of FIG. 1.

As is best seen from FIGS. 1 and 2, the material cleaned off from the filter surfaces 156 of the regeneratable filter 146 arrives at a collecting belt 178 at the bottom of the flow chamber 128, which is designed, i.e. as a endless belt circulating via a driven roller 180 and a non-driven guide roller 182.

The driven roller 180 is made to rotate by means of a drive motor 184, in order to shift the collection belt 178 in motion lengthwise of the conveyer 106.

In this way, via the collection belt 178 the material deposited on the surface of the collection belt 178 from the regeneratable surface filter 146, which includes pre-coat material and deposited wet paint over-spray, is transported to a (not shown) separating device, from which this material (i.e. by means of a stripping device) is dissolved, collected and if necessary, recycled.

The collection belt 178 also takes up a part of the wet paint over-spray which deposits directly from the exhaust air stream 120 onto the collection belt 178, before the exhaust air stream 120 reaches the regeneratable surface filter 146.

Figure 9:
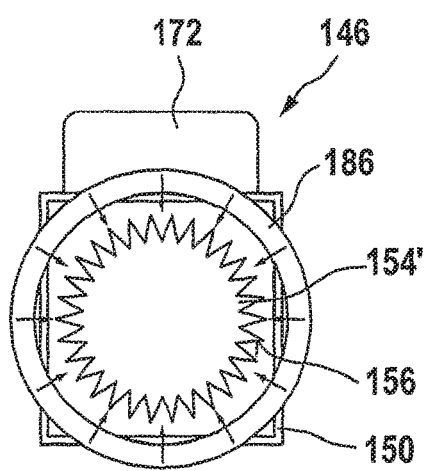
FIG. 9 a schematic cross-section through the surface filter of FIG. 8, which illustrates a cleaning process of the surface filter.
Figure 10:
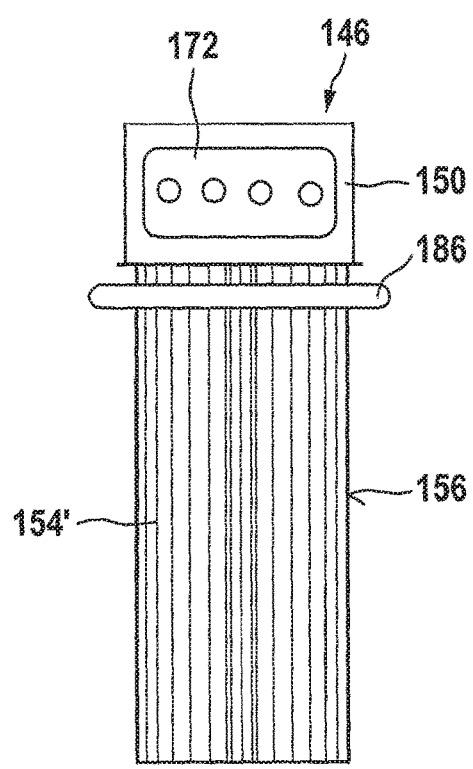
FIG. 10 a schematic top view from above the surface filter of FIGS. 8 and 9.
Figure 8:
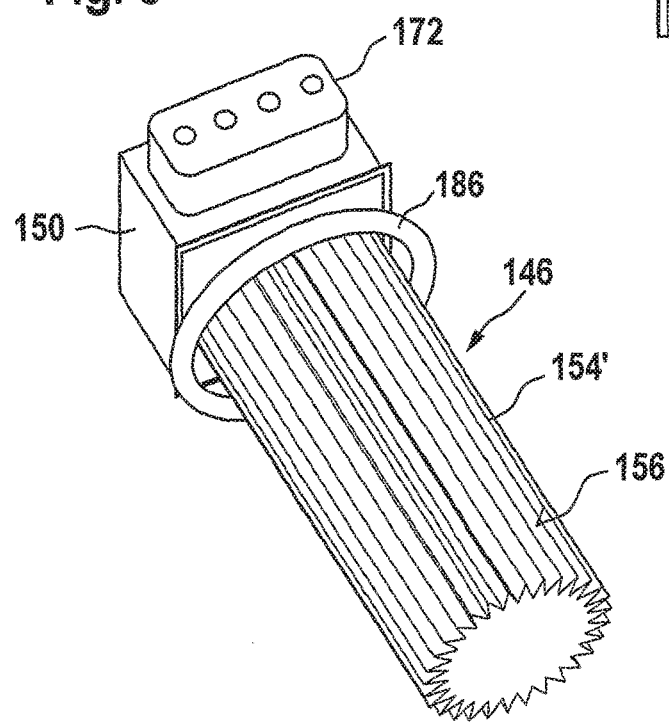
FIG. 8 a schematic representation in perspective of an alternative embodiment of a regeneratable surface filter.

An alternative development of the regeneratable surface filter 146, which is usable in the device 126, is shown in FIGS. 8 to 10.

The regeneratable surface filter 146 includes instead of multiple, vertically oriented plate-shaped filter elements arranged next to one another, an essentially cylindrical filter element 154', which also contains, viewable in the cross-section, a serrated filter surface 156 for enlargement of the available filter surface 156.

In addition, in this embodiment for production of the compressed air impulse, a rinsing liquid loop 186 is provided for cleaning of the regeneratable surface filter 146, which sprays a rinsing liquid through to the radial inner surface of the rinsing liquid delivery port of the rinsing liquid loop 186 against the filter surface 156 of the filter element 154', so that the rinsing liquid dissolves the barrier layer and the wet paint over-spray deposited on the filter surface 156 and carried on the collection belt 178.

Figure 11:
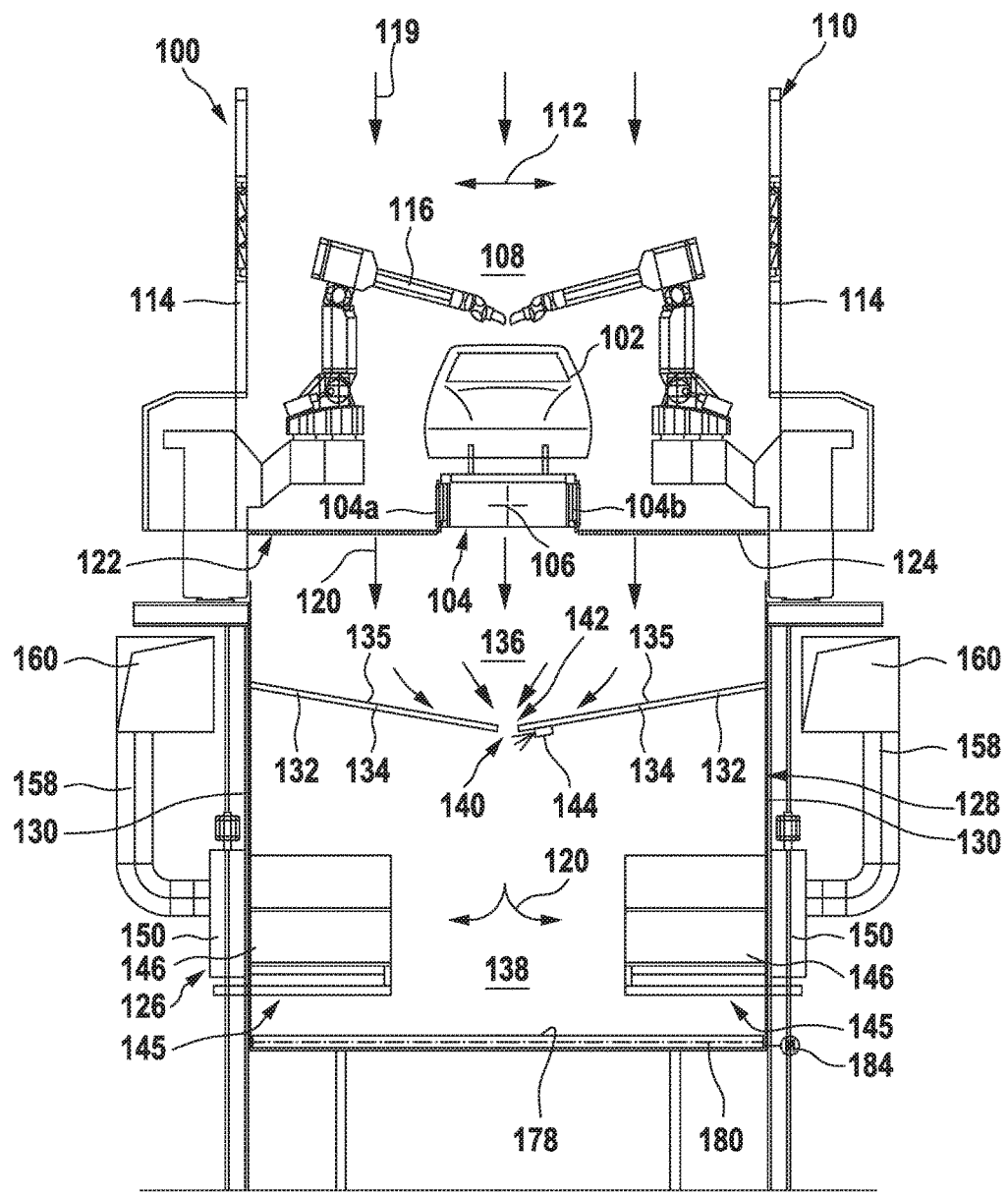
FIG. 11 a schematic cross-section through a second embodiment of a painting booth with a device arranged under it for separating wet paint over-spray from an exhaust air stream containing over-spray particles, which includes two separation devices for separating the over-spray from the exhaust air stream and also two exhaust ducts, which run laterally to the left and/or right alongside the floor plan of the painting booth, whereby a narrowed area of the flow path of the exhaust air stream is provided between an application area of the painting booth and the separation devices, which is bounded by flow guidance elements which are inclined against the horizontal.
Figure 12:
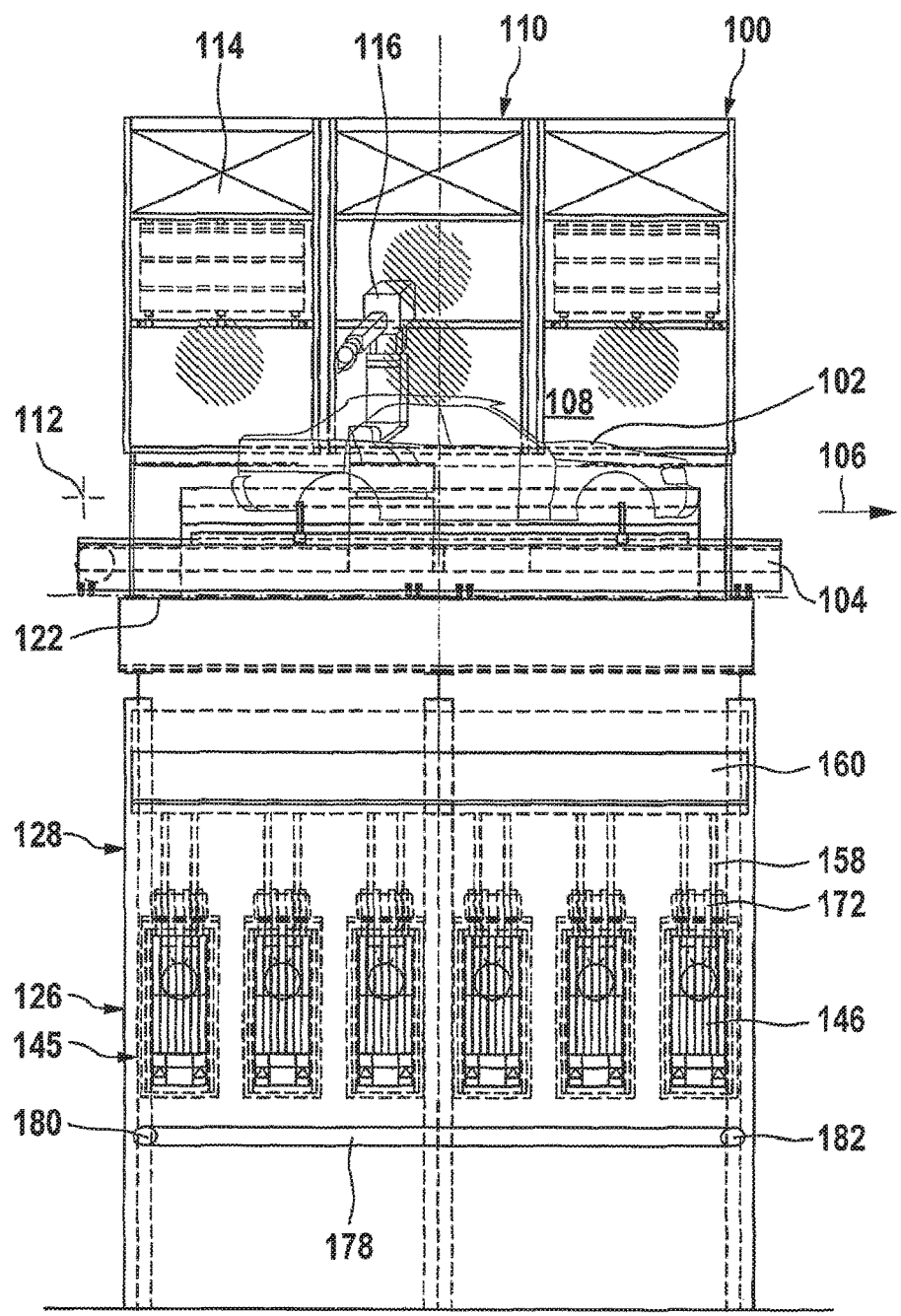
FIG. 12 a schematic side view of the installation of FIG. 11.
Figure 13:
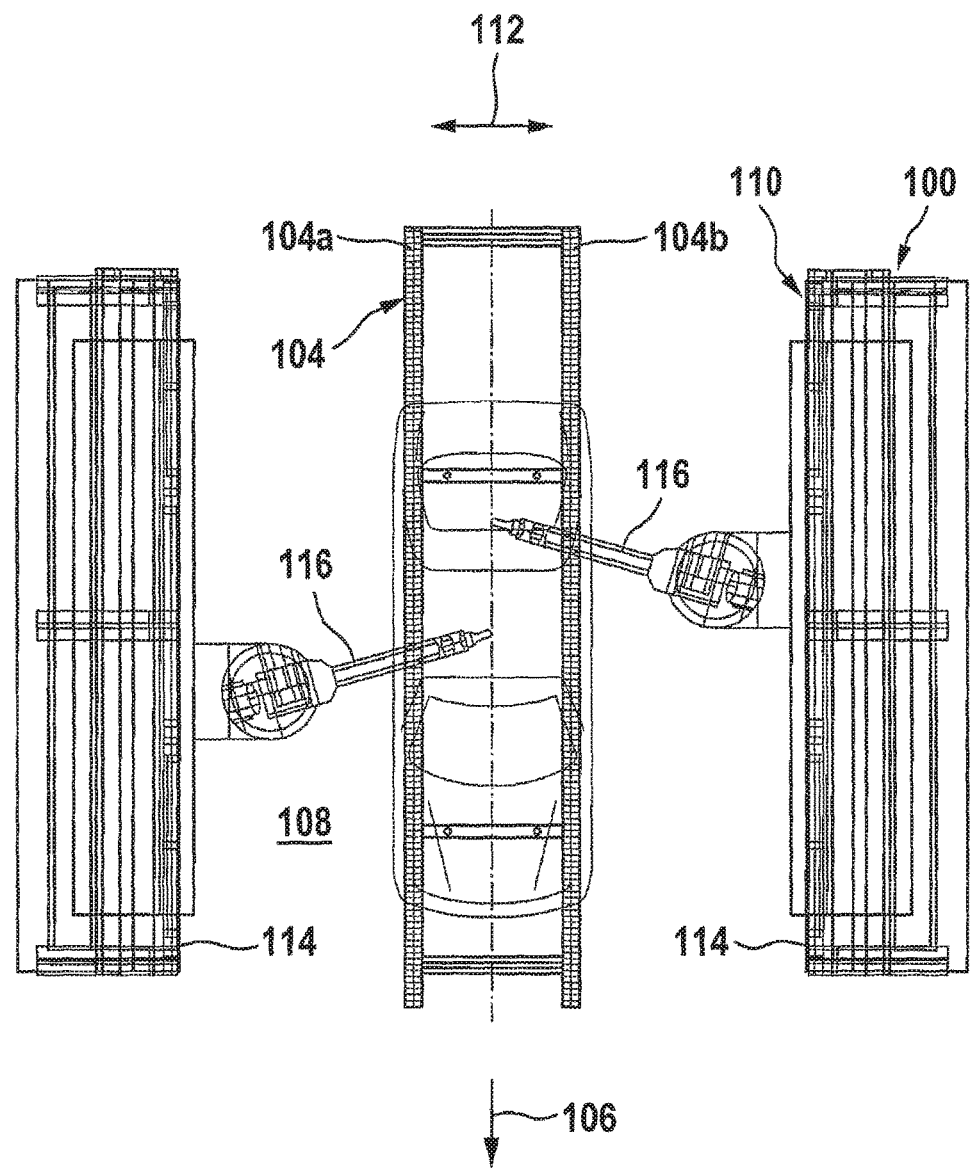
FIG. 13 a schematic top view from above of the installation of FIGS. 11 and 12.
Figure 14:
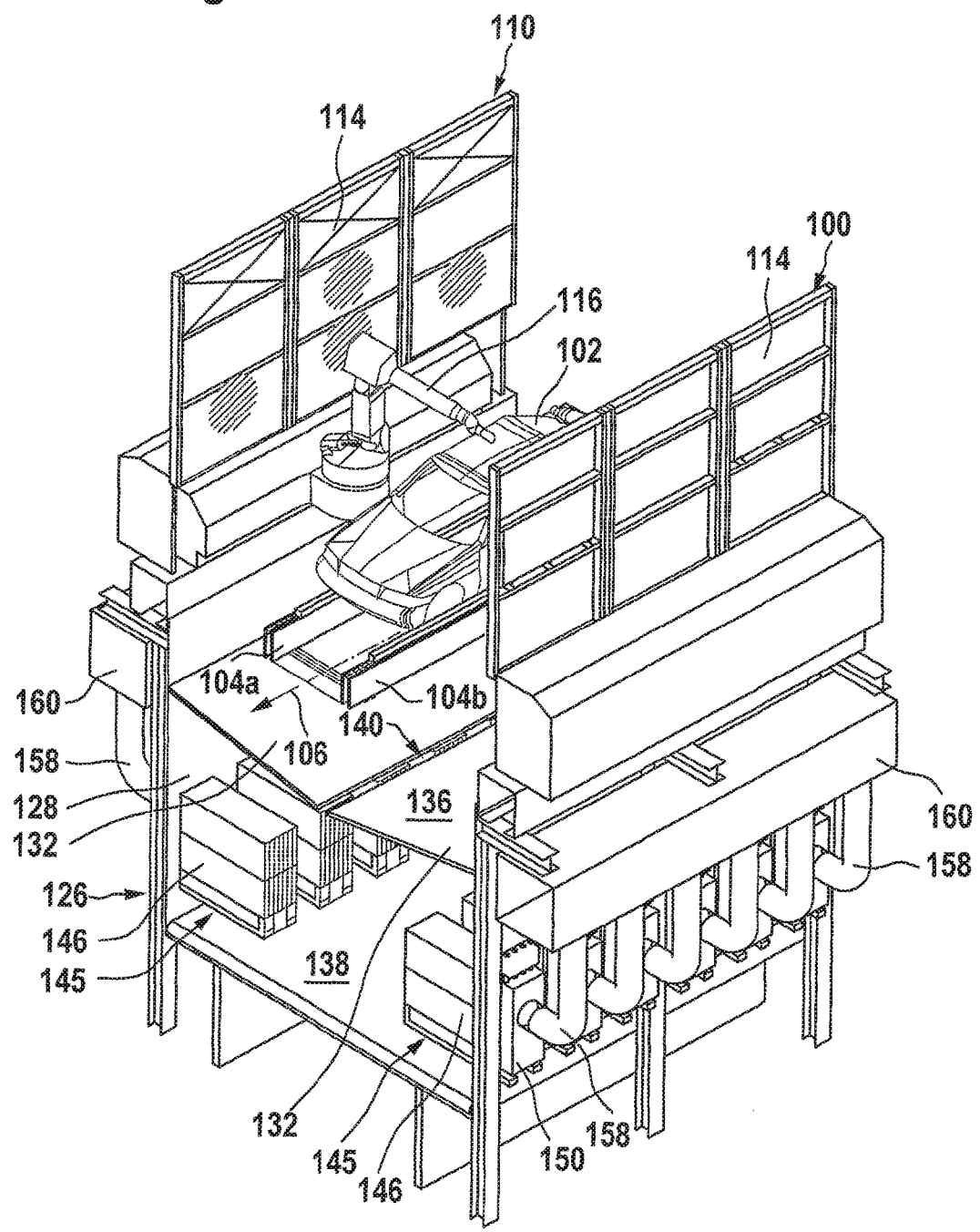
FIG. 14 a schematic representation in perspective of the installation of FIG. 11 to FIG. 13.
Figure 15:
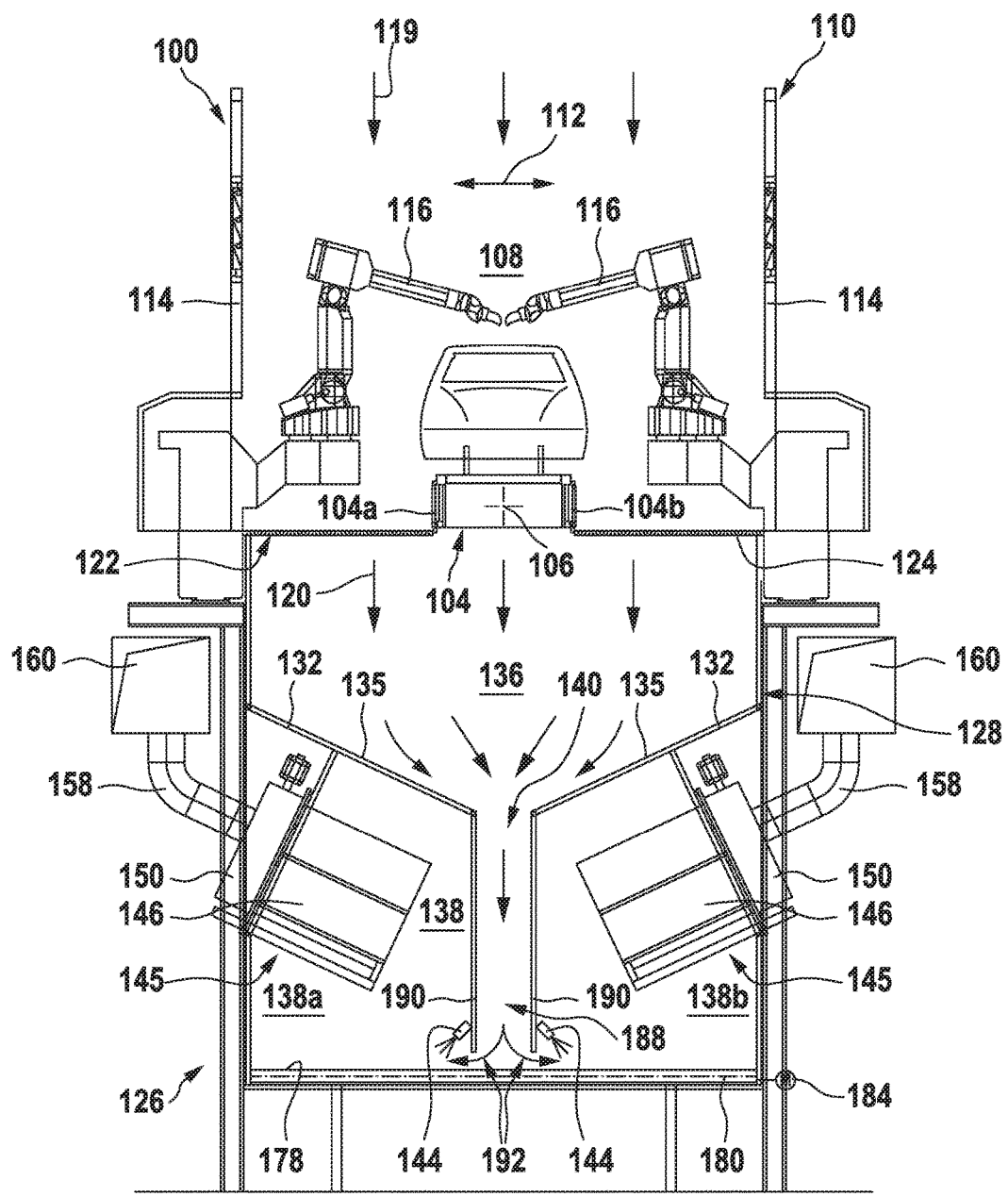
FIG. 15 a schematic cross-section through a third embodiment of a painting booth with a device arranged under it for separating wet paint over-spray from an exhaust air stream containing over-spray particles, which includes two separation devices for separating the over-spray from the exhaust air stream and also two exhaust ducts, which run laterally to the left and/or right alongside the floor plan of the painting booth, whereby between an application area of the painting booth and the separation devices a narrowed area of the flow path of the exhaust air stream is provided in the form of a shaft extending in a vertical direction.
Figure 16:
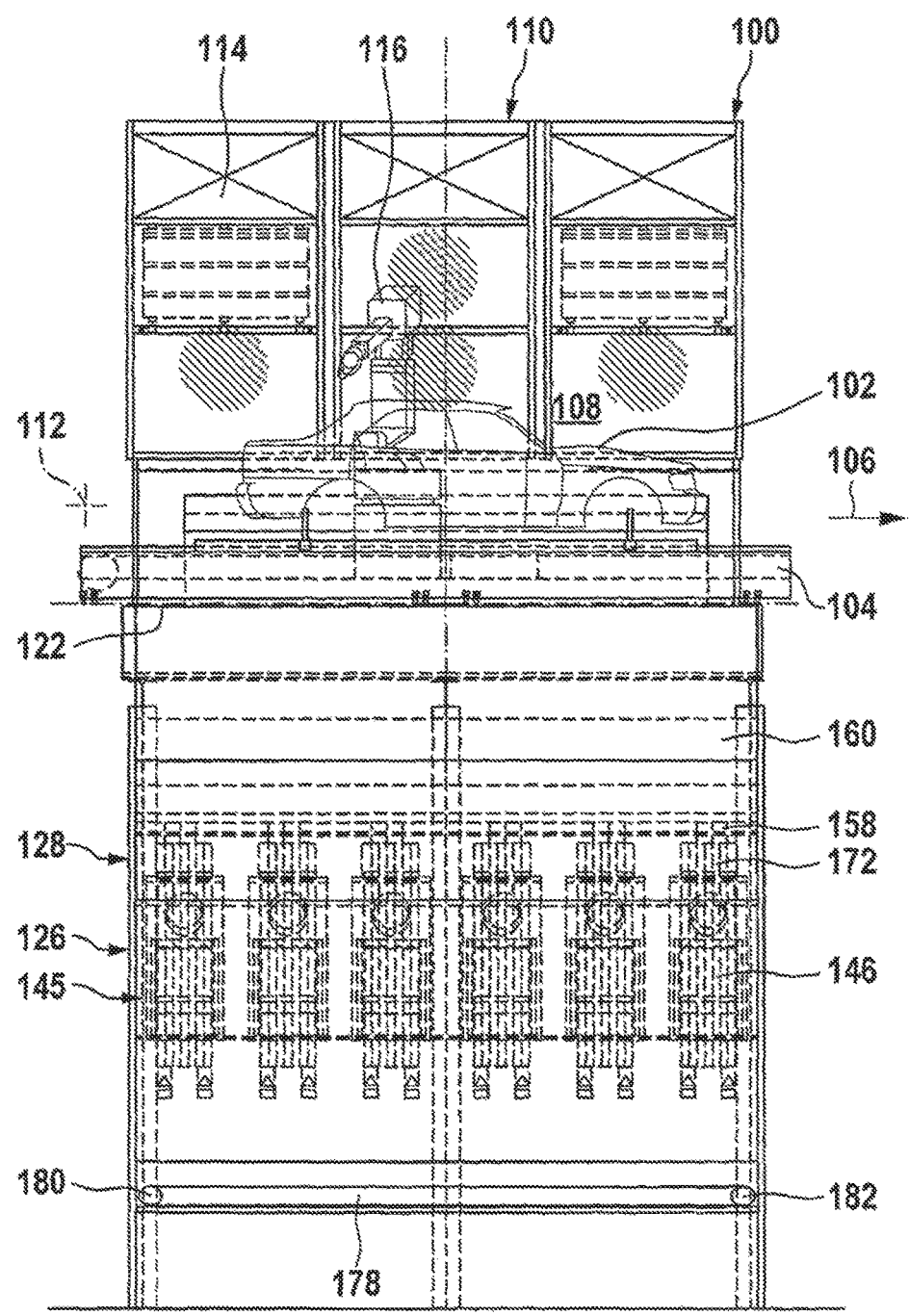
FIG. 16 a schematic side view of the installation of FIG. 15.
Figure 17:
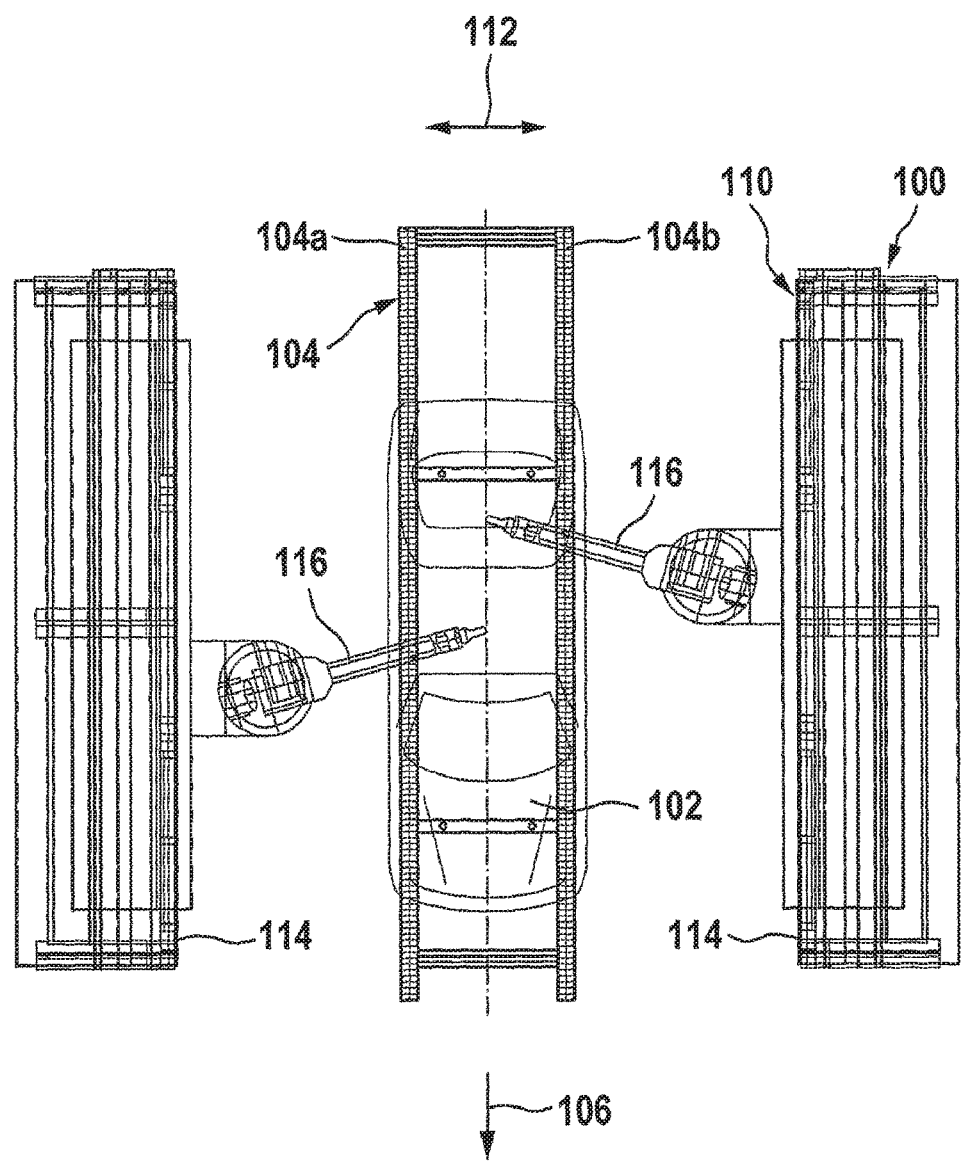
FIG. 17 a schematic top view from above of the installation of FIGS. 15 and 16.
Figure 18:
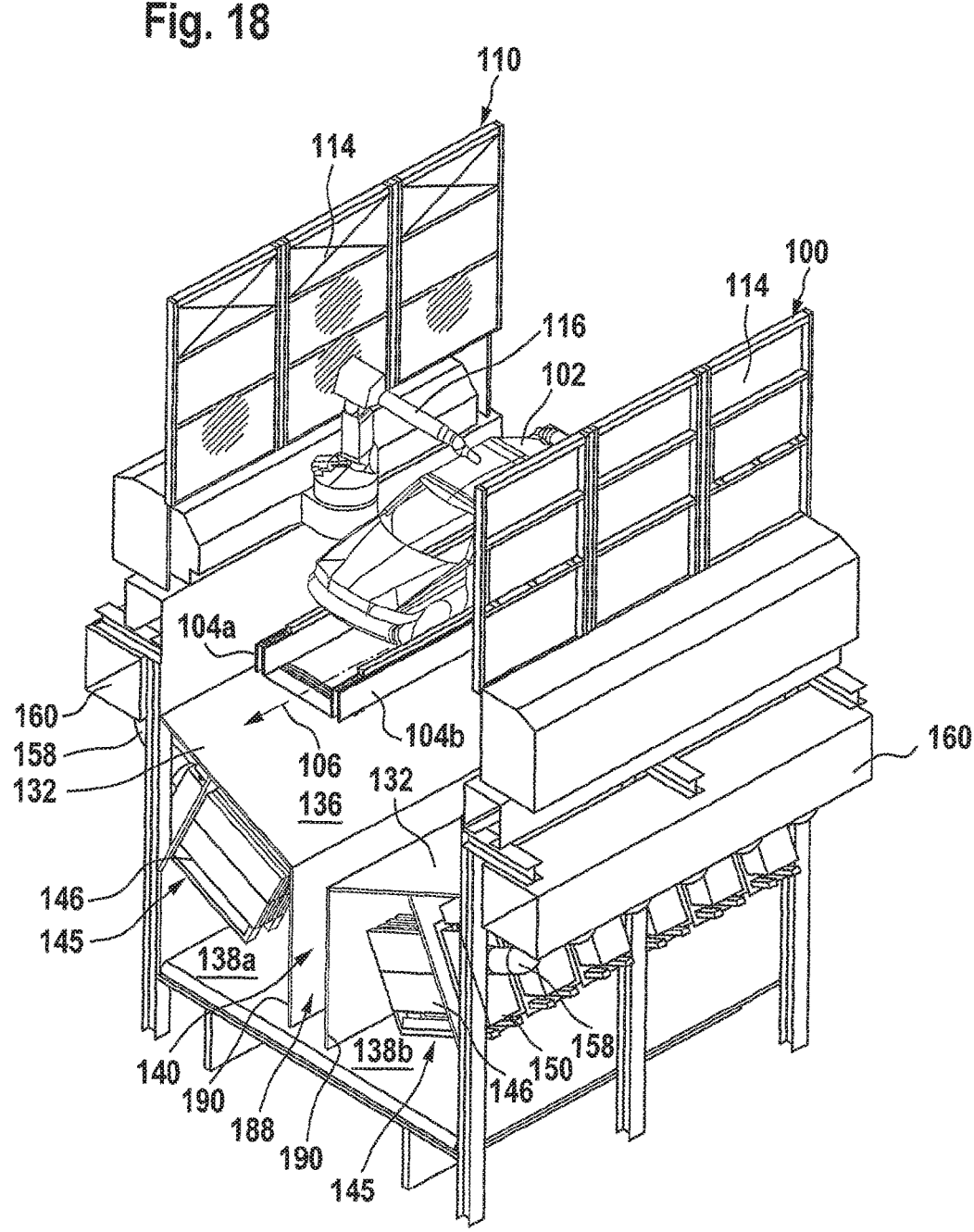
FIG. 18 a schematic representation in perspective of the installation of FIG. 15 to FIG. 17.

The second embodiment shown in FIGS. 11-14 of an installation 100 for painting of vehicle bodies 102 is thereby distinguished from the above-mentioned first embodiment, in that the flow guidance elements 132, which divide the lower section 138 from the upper section 136 of the flow chamber 128 of the device 126 for separation of the wet paint over-spray, are not in this second embodiment, in contrast to the first embodiment, aligned essentially horizontally, but rather, as is best seen from FIG. 11, but are inclined against the horizontal, so that they slope towards the narrowed area 140.

The angle of inclination against the horizontal is preferably approx. 5° to approx. 30°.

Via this inclination of the flow guidance elements 132 and therewith the flow line surfaces 135 at their top side, a funnel-shaped form of the lower area of the upper section 136 of the flow chamber 128 is obtained, through which the air stream is comparatively measured out to the narrowed area 140 and the extent of turbulences at the top side of the flow guidance elements is reduced. In this way, a lesser portion of the wet paint over-spray is already deposited on the flow line surfaces 135, before the air stream 120 reaches the lower section 138 of the flow chamber 128.

Furthermore, the flow guidance elements 132 in the second embodiment are set somewhat higher within the flow chamber 128 than in the first embodiment.

Apart from that, the second embodiment shown in FIGS. 11 to 14, of an installation 100 for painting vehicle bodies 102 agrees with respect to structure and function with the first embodiment shown in FIGS. 1-10, insofar as its' aforementioned description is concerned.

A third embodiment shown in FIGS. 15-18 of an installation 100 for painting vehicle bodies 102 is thereby distinguished from the previously described second embodiment, in that the narrowed area 140 is formed not only by a space 142 between the borders arranged opposite to each other of the flow guidance elements 132, but rather includes an exhaust air shaft 188 extending vertically downwards from borders arranged opposite to each other of the flow guidance elements 132, which is bounded on both its' side-walls by vertical side-wall ducts 190 extending in the conveyer 106.

Between the lower border of each side-wall duct 190 and the top side of the collection belt 178 a vertical space 192 is respectively formed, through which the exhaust air stream exits from the narrowed area 140 into the lower section 138 of the flow chamber 128, whereby the lower section 138 of the flow chamber 128 in this embodiment is divided into two sub-areas 138a, 138b arranged on the side of the exhaust air shaft 188.

Furthermore, in this embodiment the filter elements 154 of the regeneratable surface filter 146 do not extend in essentially horizontal direction into the lower section 138 of the flow chamber 138, but rather are inclined to a greater degree against the horizontal, and in fact are inclined preferably at about the same angle as the flow guidance surfaces 135 of the flow guidance elements 132.

This angle of inclination against the horizontal is preferably in the range from approx. 5° to approx. 30°.

On the basis of this inclination of the filter elements 154 of the regeneratable surface filter 146 opposite to the horizontal, the fundamental body 150 of the regeneratable surface filter 146 and the top area of the side-walls 130 of the lower section 138 of the flow chamber 128 are also not vertically aligned, but rather are inclined against the vertical around a sharp corner, which corresponds to the angle of inclination of the filter elements 154 and the flow guidance surfaces 135 towards the horizontal.

In this embodiment the regeneratable surface filters 146 are especially well protected against objects falling from the application area 108.

Moreover, the top section 136 and the lower section 138 of the flow chamber 128 are fluidic decoupled from each other by the air exhaust shaft 188, so that the exhaust air stream in the lower section 138 of the flow chamber 128 is independent to a large extent from the flow conditions in the top section 136 of the flow chamber 128.

Since in this embodiment two spaces 192 are present, through which the exhaust air stream 120 enters into the lower section 138 of the flow chamber 128, two pre-coat feeding devices 144 are also provided, which respectively are arranged adjacent to one of the vertical spaces 192 at the lower end of one of the shaft side-walls 190.

In addition, the third embodiment shown in FIGS. 15-18 of an installation 100 for painting of vehicle bodies 102 agrees with respect to structure and function with the first embodiment shown in FIGS. 11-14, insofar as its' aforementioned description is concerned.

A fourth embodiment shown in FIGS. 19-22 of an installation 100 for painting of vehicle bodies 102 is thereby distinguished from the previously described first embodiment, in that the device 126 for separating wet paint over-spray from the exhaust air stream 120 is not symmetrical to the longitudinal central plane 194 of the painting booth 110, but rather is asymmetrical to this longitudinal central plane 194.

Figure 19:
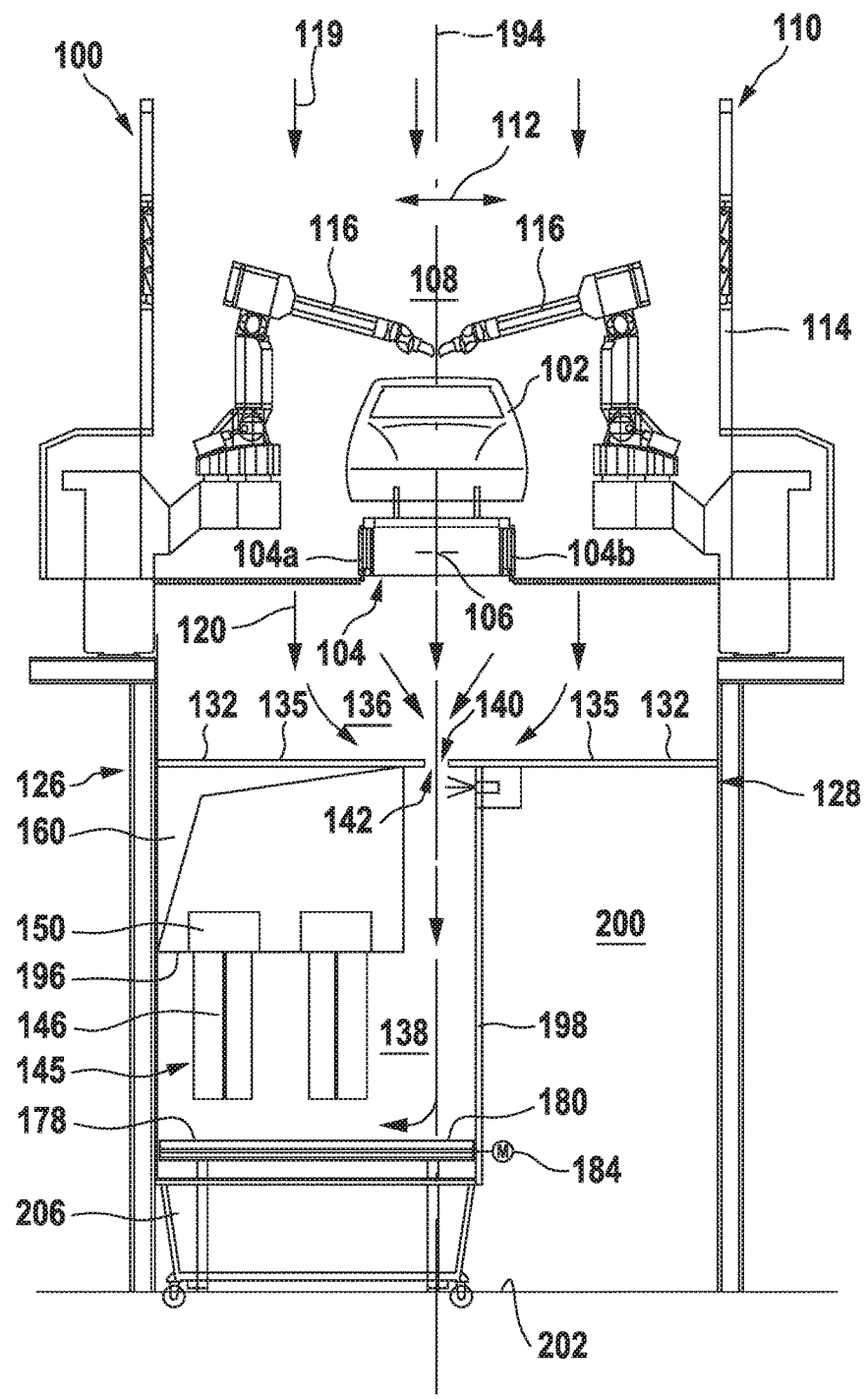
FIG. 19 a schematic cross-section through a fourth embodiment of a painting booth with a device arranged under it for separating wet paint over-spray from an exhaust air stream containing over-spray particles, which includes a separation device for separating the over-spray from the exhaust air stream and an exhaust duct arranged within a vertical projection of the basal surface of the painting booth.

In particular, the regeneratable filter surfaces 146 in this embodiment are arranged only on one side of the longitudinal central plane 194 (namely, see the side depicted on the left in FIG. 19).

In this embodiment only a single exhaust air duct 160 is provided, which however is not arranged on the side outside of the side-wall 130 of the flow chamber 128, but instead is integrated into the flow chamber 128, and is arranged directly under one of the flow guidance elements 132, so that the affected flow guidance element 132 forms an upper boundary of the exhaust air chamber 160.

In this embodiment, the regeneratable surface filters 146 are not connected via exhaust air pipe 158 with the exhaust air chamber 160, but rather are arranged directly at a lower boundary wall 196 of the exhaust air chamber 160, whereby the filter elements 154 of the regeneratable surface filter 146 hang down in essentially vertical direction from the lower boundary wall 196 of the exhaust air duct 160 into the lower section 138 of the flow chamber 128.

By this pendent arrangement, a particularly efficient cleaning of the regeneratable surface filter 146 is obtained.

The side of the flow guidance chamber 128 lying opposite to the side of the lower section 138 of the flow chamber 128 which is provided with the regeneratable surface filter 146 is separated by a vertical dividing wall 198 from the region of the lower section 138 of the flow chamber 128 which is flowed-through by the exhaust air flow stream 120.

This separated area 200 is upwardly bordered by one of the flow guidance elements 132 and extends downwards up to the base 202 of the flow chamber 128.

This area 200 which is separated from the flowed-through chamber 128 can, for example, be used for the uptake of auxiliary attachments, such as blowers, storage containers, pumps or the like.

Alternatively or additionally, it is possible to use the separated area 200 as an air duct, i.e. as an additional exhaust air duct, fresh air supply duct or exhaust air discharge duct.

The flowed-through area of the lower section 138 of flow chamber 128 is bordered downwards by the collection belt 178.

Figure 20:
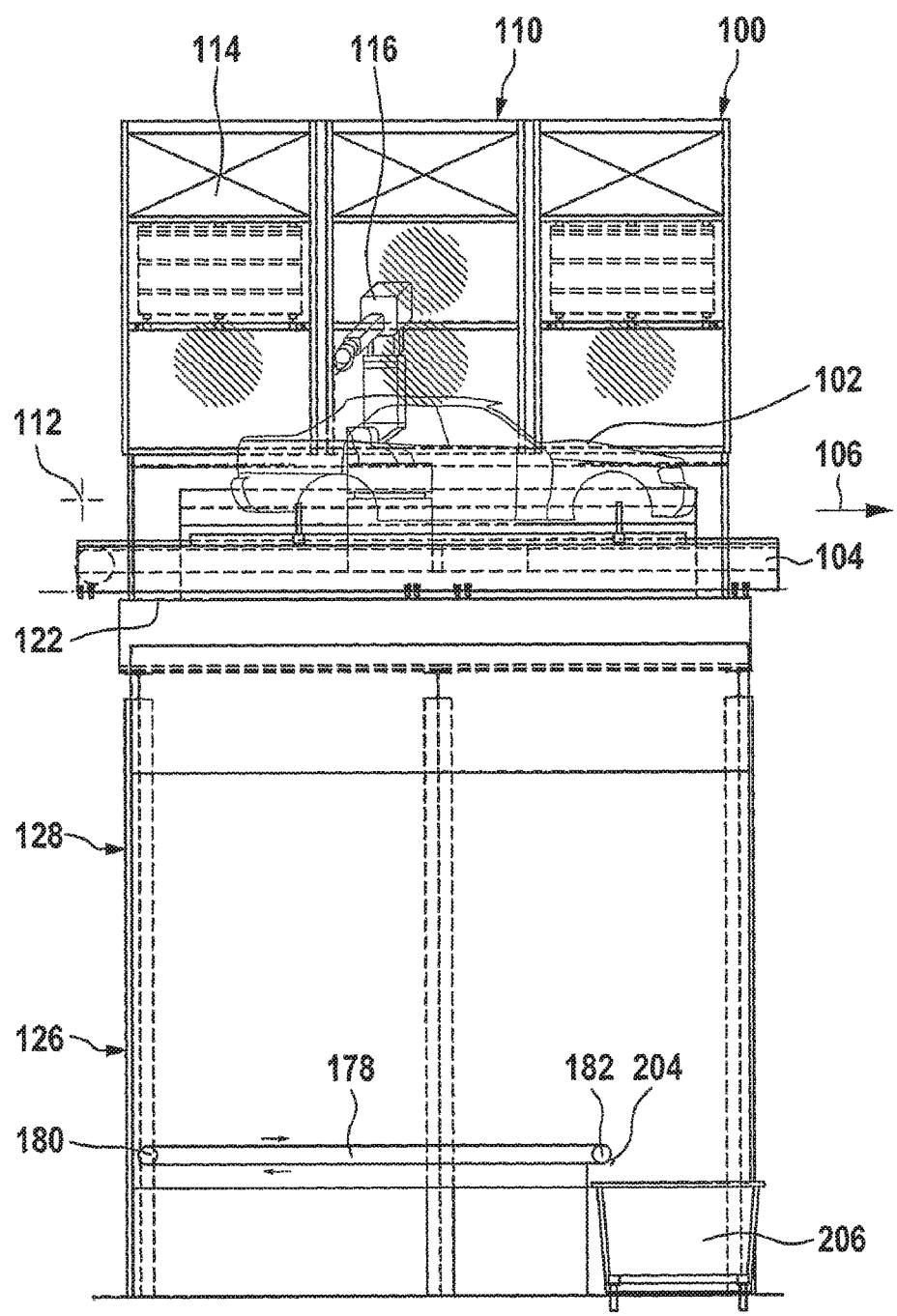
FIG. 20 a schematic side view of the installation of FIG. 19.
Figure 21:
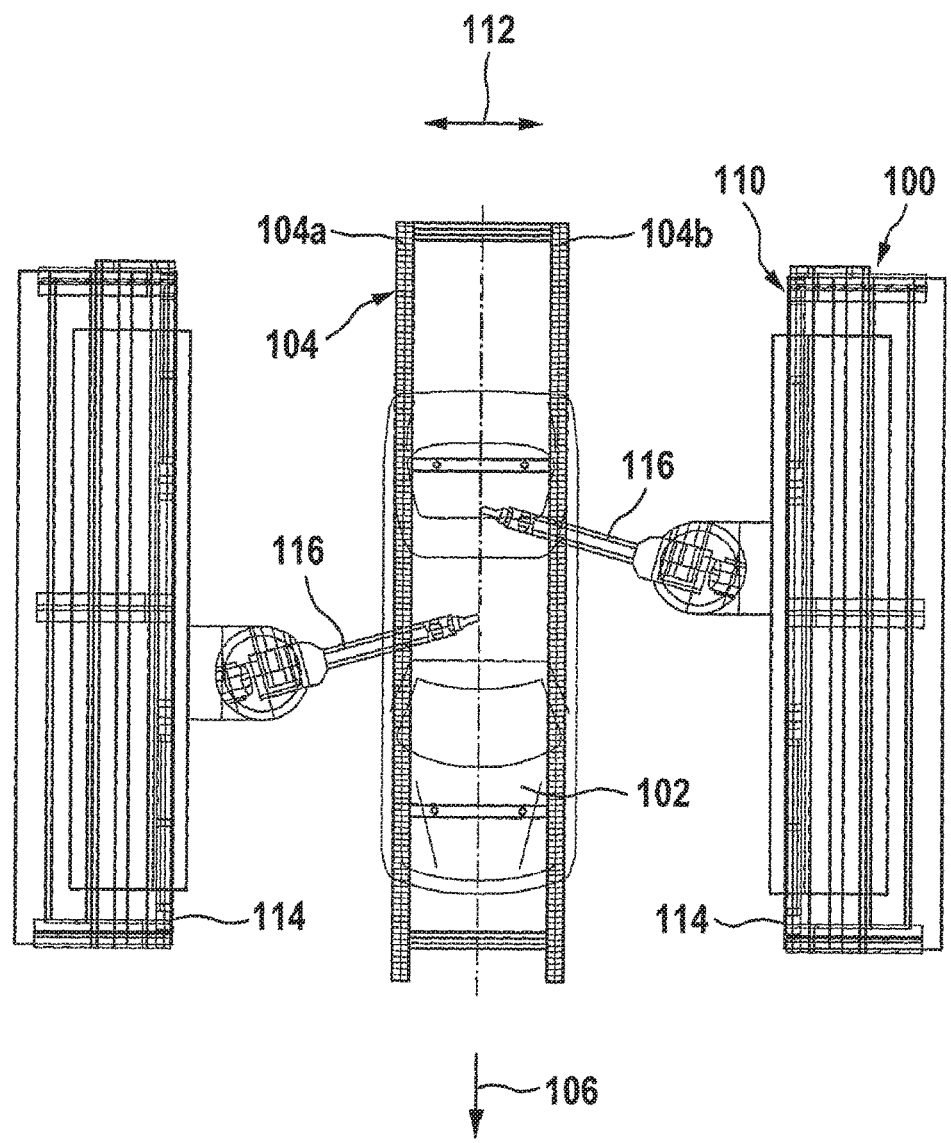
FIG. 21 a schematic top view from above of the installation of FIG. 19 and FIG. 20.
Figure 22:
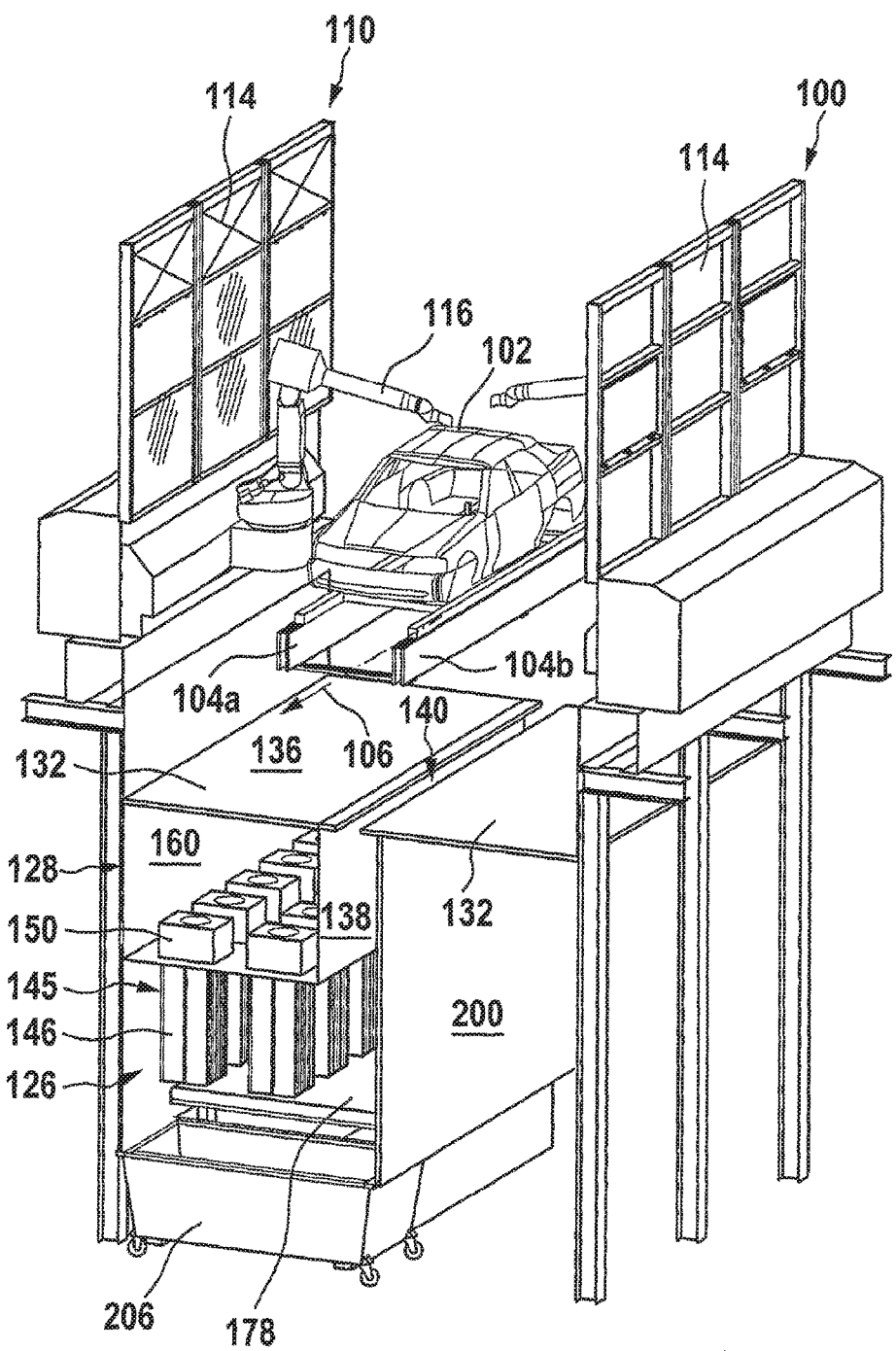
FIG. 22 a schematic representation in perspective of the installation of FIGS. 19 to 21.

In particular it is clear from FIG. 20 that the collection band 178 is not cleaned in the area of its' non-driven guide roller 182 via a stripping device 204 of the material collected from the surface of the collection belt 178, which contains pre-coat material and deposited wet pain over-spray, whereby the material stripped-off by the collection belt 178 is deposited into a mobile storage container 206.

If in the mobile storage container 206 a specified highest fill level is reached, the mobile storage container 206 is exchanged for an empty mobile storage container and the filled mobile storage container 206 is conveyed to a (not shown) collection and recycling station.

Since in the fourth embodiment shown in FIGS. 19-22 all components of the device 126 for separating wet paint over-spray are arranged within the vertical projection of the basal surface of the painting booth 110, this embodiment is particularly compact in construction and is specially suited for crowded space conditions.

Moreover, the fourth embodiment shown in FIGS. 19-22 agrees in respect to structure and function with the first embodiment shown in FIGS. 1-10, insofar as its' previous description is concerned.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. Installation for painting of objects, in particular vehicle bodies, comprising at least one painting booth and at least one device for separating wet paint over-spray from an over-spray particle-containing exhaust air stream, wherein the overspray particles pass into the exhaust air stream in an application area of the painting installation; wherein the at least one device for separating wet paint over-spray from the over-spray particle-containing exhaust air stream comprises at least one separation device for separating the over-spray from at least a part of the exhaust air stream, which has at least one filter element, wherein the at least one filter element has a barrier layer including a pre-coat material deposited on a porous filter surface, which prevents agglutination of the filter surface, wherein the at least one filter element comprises an interior space into which the exhaust air stream passes through the filter surface, wherein the at least one device for separating wet paint over-spray from the over-spray particle-containing exhaust air stream is configured to cleanse the pre-coat material and wet paint over-spray deposited on the filter surface off the filter surface by compressed air pulses passing from the interior space of the at least one filter element through the filter surface, wherein the flow path of the exhaust air stream from the application area to the separation device has at least one narrowed area located upstream of the at least one filter element, and wherein the at least one device for separating wet paint over-spray from the exhaust air stream comprises flow guidance elements, which are arranged at an angle of inclination against the horizontal, wherein upper sides of the flow guidance elements each form a respective flow guidance surface which directs the exhaust air stream to the narrowed area.

2. Installation according to claim 1, wherein the narrowed area is disposed beneath the application area.

3. Installation according to claim 1, wherein the application area is arranged in a painting booth with a longitudinal direction, and wherein the narrowed area is divided in the longitudinal direction of the painting booth into a plurality of narrowed sub-areas.

4. Installation according to claim 1, wherein the entrance of the exhaust air stream into the narrowed area is disposed above the at least one filter element.

5. Installation according to claim 1, wherein the at least one device for separating wet paint over-spray from the over-spray particle-containing exhaust air stream includes at least one pre-coat supply device, which delivers a pre-coat material into the exhaust air stream.

6. Installation according to claim 1, wherein the at least one filter element is capable of being cleaned in intervals.

7. Installation according to claim 1, wherein the at least one filter element exhibits a moist surface in the operation of the at least one device for separating wet paint over-spray from the over-spray particle-containing exhaust air stream.

8. Installation according to claim 7, wherein the surface of the at least one filter element is capable of being rinsed-off continuously or in intervals.

9. Installation according to claim 1, wherein the at least one device for separating wet paint over-spray from the over-spray particle-containing exhaust air stream contains an air circulation circuit, in which the exhaust air stream from which the wet paint over-spray has been separated, is at least partially supplied to the application area again.

10. Installation according to claim 1, wherein the at least one device for separating wet paint over-spray from the over-spray particle-containing exhaust air stream comprises a flow chamber, wherein filter elements are arranged only on one side of a longitudinal central plane of the painting booth and wherein a side of the flow chamber lying opposite to the side of the flow chamber which is provided with the filter elements is separated by a dividing wall from a region of the flow chamber which is flowed-through by the exhaust air stream, so that a separated area is formed.

11. Installation according to claim 10, wherein the separated area takes up auxiliary attachments in the form of blowers, storage containers and/or pumps and/or an exhaust air duct.

12. Installation according to claim 10, wherein the separated area covers at least a part of a base of the at least one device for separating wet paint over-spray from the over-spray particle-containing exhaust air stream and is upwardly bordered by one of the flow guidance elements and laterally bordered by the dividing wall.

13. Installation according to claim 10, wherein the separated area is upwardly bordered by one of the flow guidance elements.

14. Installation according to claim 1, wherein the at least one device for separating wet paint over-spray from the over-spray particle-containing exhaust air stream comprises a flow chamber which is subdivided into an upper section and a lower section by the flow guidance elements, wherein the upper section and the lower section are connected to each other by the narrowed area and the narrowed area comprises an exhaust air shaft which is bounded by shaft side walls extending in a conveying direction of the objects.

15. Installation according to claim 1, wherein a storage container for pre-coat material and deposited wet paint over-spray is arranged vertically below the filter element and wherein pre-coat material and wet paint over-spray that are cleaned off the filter element in intervals are collected in the storage container.

16. Installation according to claim 1, wherein the at least one filter element is configured to be cleaned by compressed air impulses, in intervals, wherein new pre-coat material is applied without prior cleaning of the filter element.

17. Installation according to claim 1, wherein the at least one filter element is formed substantially in a plate shape.

18. Installation according to claim 1, wherein the at least one device for separating wet paint over-spray from the over-spray particle-containing exhaust air stream is configured asymmetrically to a longitudinal central plane of the painting booth.

19. Installation according to claim 1, wherein exhaust air purified from the wet paint over-spray at least partially passes to an air flow production device which conducts the purified exhaust air via a supply line once again to the application area of the painting installation.

20. Installation according to claim 1, wherein the narrowed area is formed by a space between opposing borders of the flow guidance elements.

21. Installation according to claim 1, wherein the narrowed area comprises an exhaust air shaft extending vertically downwards from opposing borders of the flow guidance elements.

22. Installation according to claim 1, wherein the at least one device for separating wet paint over-spray from the over-spray particle-containing exhaust air stream comprises a flow chamber which is subdivided into an upper section and a lower section, wherein the upper section and the lower section are connected to each other by the narrowed area.

23. Installation according to claim 1, wherein the application area is arranged in a painting booth with a transverse direction, and wherein the narrowed area is divided in the transverse direction of the painting booth into a plurality of narrowed sub-areas.

24. Installation according to claim 1, wherein a central direction of flow of the exhaust air stream remains substantially preserved as the exhaust air stream passes through the narrowed area.

25. Installation according to claim 1, wherein the flow guidance elements are arranged horizontally.

26. Installation according to claim 1, wherein the at least one device for separating wet paint over-spray from the over-spray particle-containing exhaust air stream comprises a flow chamber which is subdivided into an upper section and a lower section by the flow guidance elements,
    wherein the upper section and the lower section are connected to each other by the narrowed area, and
    wherein at least one of the at least one separation device is provided on both sides, respectively, of the narrowed area.

27. Installation according to claim 1, wherein the flow guidance elements are arranged at an angle of inclination against the horizontal between 5° and 30°.

\* \* \* \* \*